United States Patent
Barton et al.

(10) Patent No.: US 12,539,141 B2
(45) Date of Patent: Feb. 3, 2026

(54) PENETRATIVE MEDICAL ACCESS DEVICES, AND RELATED METHODS AND SYSTEMS

(71) Applicant: Creare LLC, Hanover, NH (US)

(72) Inventors: Michael D. Barton, Hanover, NH (US); Sheldon D. Stokes, Grantham, NH (US); Brynmor J. Davis, Etna, NH (US); David R. Callender, Lebanon, NH (US)

(73) Assignee: Creare LLC, Hanover, NH (US)

( * ) Notice: Subject to any disclaimer, the term of this patent is extended or adjusted under 35 U.S.C. 154(b) by 580 days.

(21) Appl. No.: 18/091,019

(22) Filed: Dec. 29, 2022

(65) Prior Publication Data

US 2023/0200847 A1  Jun. 29, 2023

Related U.S. Application Data

(60) Provisional application No. 63/294,510, filed on Dec. 29, 2021.

(51) Int. Cl.
*A61B 17/34* (2006.01)
*A61B 17/00* (2006.01)
(Continued)

(52) U.S. Cl.
CPC ...... *A61B 17/3403* (2013.01); *A61B 17/3423* (2013.01); *A61B 17/3476* (2013.01);
(Continued)

(58) Field of Classification Search
CPC ............ A61B 17/3403; A61B 17/3423; A61B 17/3476; A61B 2017/00221;
(Continued)

(56) References Cited

U.S. PATENT DOCUMENTS 8,043,229 B2  10/2011  Mulvihill et al.
8,328,738 B2  12/2012  Frankhouser et al.
(Continued)

FOREIGN PATENT DOCUMENTS

JP  4361797 B2  11/2009
JP  2015139576 A  8/2015
(Continued)

OTHER PUBLICATIONS

Brattain, Laura J. et al.; AI-Enabled, Ultrasound-Guided Handheld Robotic Device for Femoral Vascular Access; Biosensors 2021, 11, 522; https://doi.org/103390/bios11120522; https://www.mdpi.com/journal/biosensors; Dec. 18, 2021; pp. 1-20.
(Continued)

*Primary Examiner* — Chao Sheng
(74) *Attorney, Agent, or Firm* — Downs Rachlin Martin PLLC

(57) ABSTRACT

Penetrative access devices for assisting users in performing any one or more of various medical procedures that require inserting a needle into a patient, such as for vascular access, pneumothorax decompression, catheterization, abscess draining, etc. In some embodiments, a penetrative access device of this disclosure is a handheld device that is fully self-contained in that it contains all of the hardware and software needed to perform the penetrative access. In some embodiments, a penetrative access device of this disclosure is a handheld device that cooperates, within a penetrative access system, with one or more devices external to the penetrative access device in providing the requisite penetrative access features. Various related methods are also disclosed, including methods of using a penetrative access device/system of the disclosure, methods of performing access operations, and methods of contactlessly calibrating needle-tip location for accurate needle-tip guidance.

56 Claims, 16 Drawing Sheets

(51) Int. Cl.
*A61B 34/00* (2016.01)
*A61B 34/20* (2016.01)

(52) U.S. Cl.
CPC ............ *A61B 34/20* (2016.02); *A61B 34/25* (2016.02); *A61B 2017/00221* (2013.01); *A61B 2017/3413* (2013.01); *A61B 2017/3425* (2013.01); *A61B 2017/3492* (2013.01); *A61B 2034/2063* (2016.02); *A61B 2034/2065* (2016.02); *A61B 2034/2072* (2016.02); *A61B 2034/2074* (2016.02); *A61B 2034/254* (2016.02)

(58) Field of Classification Search
CPC .... A61B 2017/3425; A61B 2017/3492; A61B 34/20; A61B 34/25; A61B 2034/2063; A61B 2034/2065; A61B 2034/2072; A61B 2034/2074; A61B 2034/254
See application file for complete search history.

(56) References Cited

U.S. PATENT DOCUMENTS

| | | | |
|---|---|---|---|
| 8,663,130 B2 | 3/2014 | Neubach et al. | |
| 8,870,865 B2 | 10/2014 | Frankhouser et al. | |
| 9,427,207 B2 | 8/2016 | Sheldon et al. | |
| 9,439,653 B2 | 9/2016 | Avneri et al. | |
| 9,510,783 B2 | 12/2016 | Hadjioannou et al. | |
| 9,743,875 B2 | 8/2017 | Maguire et al. | |
| 10,118,020 B2 | 11/2018 | Avneri et al. | |
| 10,124,144 B2 | 11/2018 | Avneri et al. | |
| 10,940,292 B2 | 3/2021 | Bagwell et al. | |
| 10,960,126 B2 | 3/2021 | Perng et al. | |
| 10,987,488 B2 | 4/2021 | Aveneri et al. | |
| 2004/0059285 A1 | 3/2004 | Mathiesen et al. | |
| 2006/0020211 A1* | 1/2006 | Tokumoto ............ | A61B 8/0833 600/464 |
| 2009/0275823 A1 | 11/2009 | Ayati et al. | |
| 2012/0259221 A1 | 10/2012 | Sheldon et al. | |
| 2013/0072856 A1 | 3/2013 | Frankhouser et al. | |
| 2013/0150724 A1* | 6/2013 | Blaivas ................... | A61B 8/467 600/461 |
| 2013/0303910 A1* | 11/2013 | Hubbard ............... | A61B 8/4461 600/443 |
| 2014/0051984 A1 | 2/2014 | Berger et al. | |
| 2016/0317242 A1 | 11/2016 | Herlihy et al. | |
| 2017/0188990 A1 | 7/2017 | Von Allmen et al. | |
| 2018/0325547 A1 | 11/2018 | Bagwell et al. | |
| 2019/0046769 A1 | 2/2019 | Avneri et al. | |
| 2019/0357876 A1 | 11/2019 | Grunwald et al. | |
| 2020/0230391 A1 | 7/2020 | Burkholz et al. | |
| 2020/0237255 A1 | 7/2020 | Silverstein et al. | |
| 2020/0261113 A1* | 8/2020 | Bagwell ................ | A61B 8/4488 |
| 2020/0338309 A1 | 10/2020 | Kopperschmidt et al. | |
| 2020/0390340 A1 | 12/2020 | Anderson et al. | |
| 2021/0045711 A1 | 2/2021 | Brattain et al. | |
| 2021/0059636 A1 | 3/2021 | Durfee et al. | |
| 2021/0205580 A1 | 7/2021 | Avneri et al. | |
| 2021/0282950 A1 | 9/2021 | MacTaggart et al. | |

FOREIGN PATENT DOCUMENTS

| | | |
|---|---|---|
| KR | 10-2020-0006886 A | 1/2020 |
| WO | 2019048269 A1 | 3/2019 |
| WO | 2020142338 A1 | 7/2020 |

OTHER PUBLICATIONS

International Search Report and Written Opinion dated May 4, 2023, in connection with PCT/US2022/054221.

Zevallos, Nico et al., Toward Robotically Automated Femoral Vascular Access, arXiv:2107.02839v1; cs.RO, Jul. 6, 2021—pp. 1-6.

Leipheimer, Josh M., et al. First-in-human evaluation of a hand-held automated venipuncture device for rapid venous blood draws; Technology, vol. 7, Nos. 3 and 4, September and Dec. 2019; www.worldscientific.com.

* cited by examiner

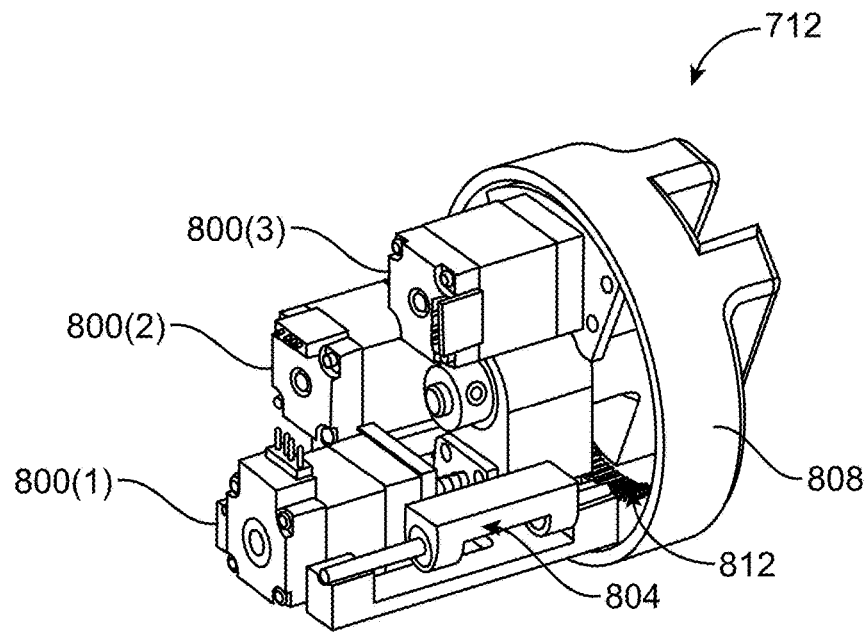
FIG. 8A
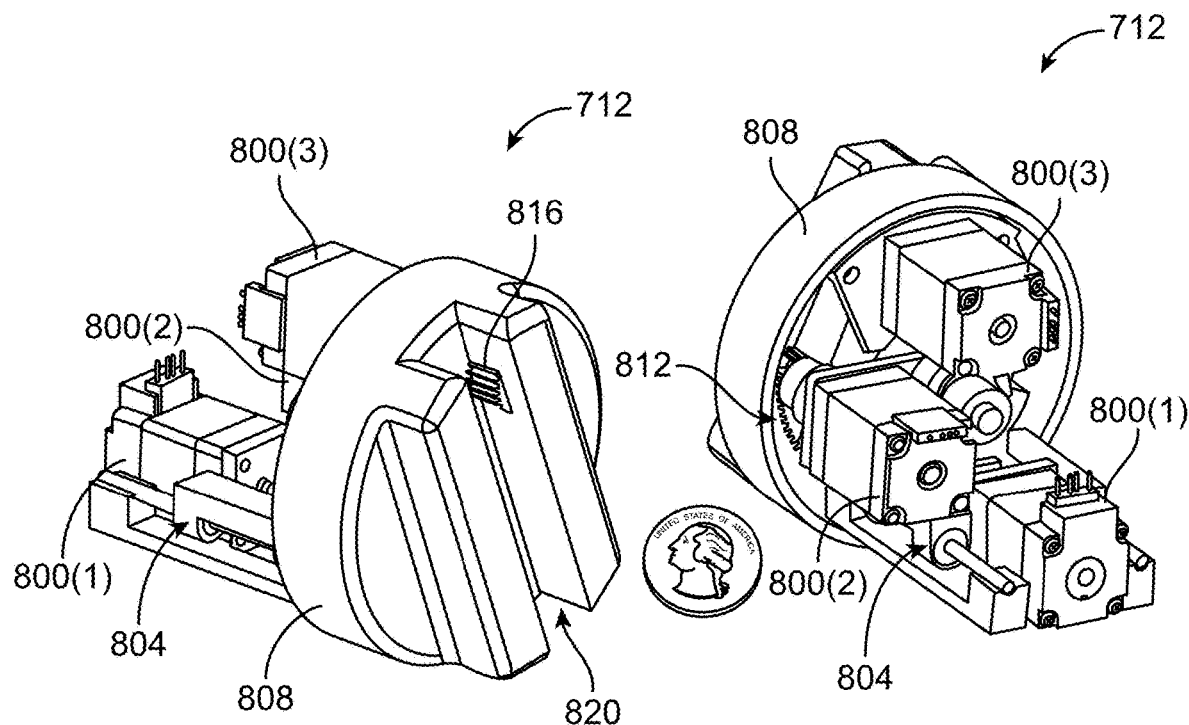
FIG. 8B
FIG. 8C

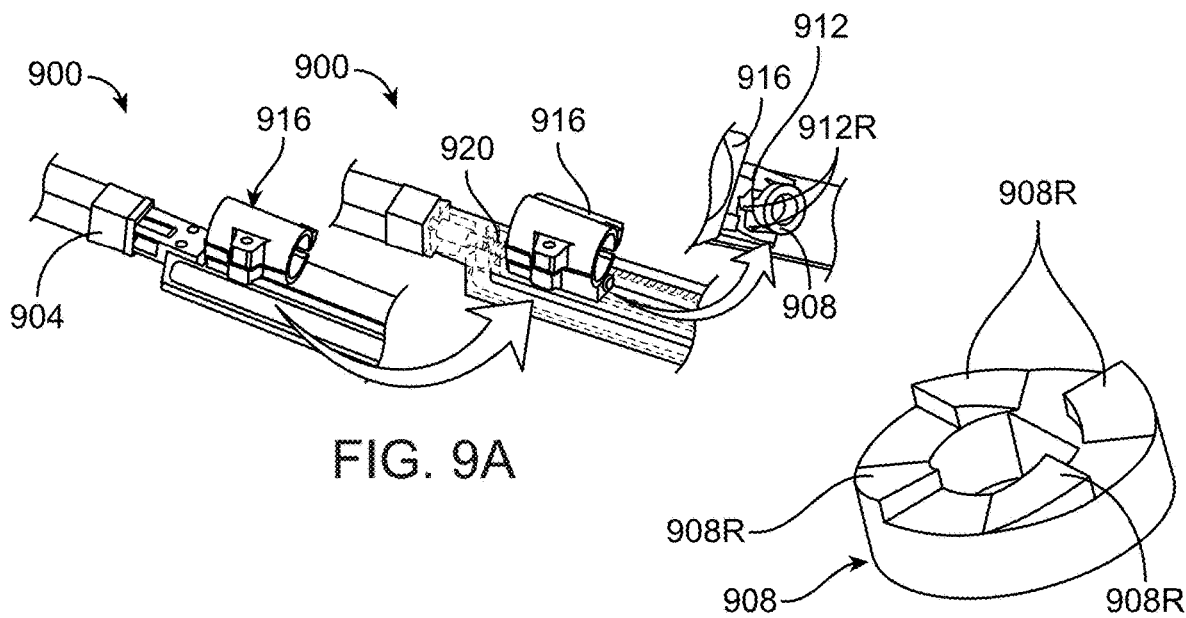
FIG. 9A
FIG. 9B
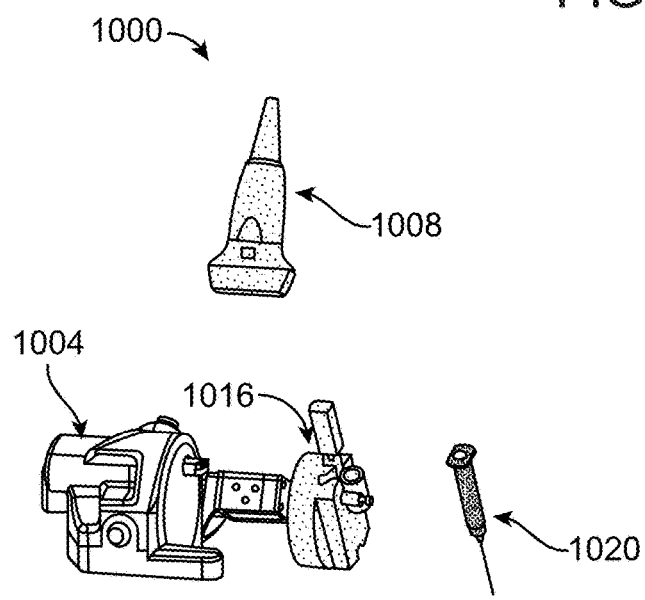
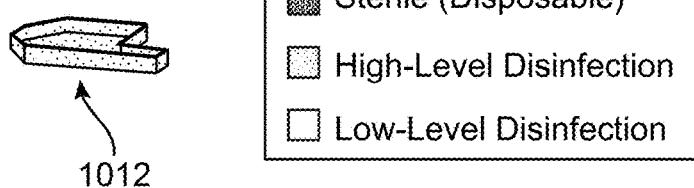
FIG. 10

PENETRATIVE MEDICAL ACCESS DEVICES, AND RELATED METHODS AND SYSTEMS

RELATED APPLICATION DATA

This application claims the benefit of priority of U.S. Provisional Patent Application Ser. No. 63/294,510, filed Dec. 29, 2021, and titled "Vascular Access Devices, and Related Methods and Systems", which is incorporated by reference herein in its entirety.

FIELD OF THE INVENTION

The present invention generally relates to the field of vascular access. In particular, the present invention is directed to penetrative medical access devices, and related methods and systems.

BACKGROUND

Rapid and reliable vascular access is an essential step in the stabilization and treatment of seriously ill patients—including trauma patients—as it enables fluid resuscitation, transfusions, and the administration of medications. Vascular access is particularly difficult when patients are volume-depleted from blood loss or dehydration, vasoconstricted, hypothermic, obese, or abusing intravenous (IV) drugs. Ultrasound (US) guidance improves the reliability of vascular access and is rapidly becoming a standard of care. However, US-guided vascular access requires the presence of physicians or others with advanced medical training that is not usually available to first responders or many other healthcare providers. Although miniaturization of US systems has facilitated vascular access in recent years, vascular access still requires skill-intensive medical training to manually guide the needle to the vessel wall and to penetrate the vessel. Major technical advances are needed to enable lifesaving US-guided vascular access outside of a traditional emergency department by healthcare providers with limited US training.

Prior to the widespread use of US-guided cannulation beginning in the 1970s, highly trained and experienced clinicians would employ the "landmark" cannulation technique by visually evaluating the surface anatomy and then palpate to identify target vessels before cannulation attempts. Once vascular access has been gained, the cannulation process is typically carried out with a modified Seldinger technique, by using a wire guide to insert a catheter into the vein or artery to administer standard IV therapies, and more recently, for invasive monitoring and to employ emerging hemodynamic resuscitation technologies such as resuscitative endovascular balloon occlusion of the aorta (REBOA). Early research, beginning around 1984, showed that using US to assist with central venous cannulation (CVC) improves success rates and lowers complications. Since then, multiple studies have confirmed these findings and demonstrated that ultrasound-guided vascular access increases success rate, lowers complications, and reduces costs. However, US-guided vascular access requires an experienced and highly trained clinician, along with standard medical US equipment, which is not suitable for use outside of a trauma care center.

SUMMARY OF THE DISCLOSURE

In an implementation, the present disclosure is directed to an apparatus for assisting a user with penetratingly accessing a targeted anatomical structure within a patient during an access procedure. The apparatus includes a body that includes a grasping region designed, configured, and provided to allow the user to grasp the apparatus with a first hand of the user so as to handhold and manipulate the apparatus during the access procedure; at least one user control deployed to allow the user to control at least one function of the apparatus, the at least one control being located on the body so as to be accessible to actuation by the first hand of the user while the first hand is handholding the apparatus by the grasping region during the access procedure; and a patient-contacting region designed, configured, and located so as to contact the patient during the access procedure; an imaging transducer coupled to the body so as to move with the body when the user manipulates the apparatus, the imaging transducer deployed to generate images of tissue inside the patient during the access procedure; and a needle-manipulation system coupled to the body so as to move with the body when the user manipulates the apparatus, the needle-manipulation system including a needle holder that holds a needle, having a needle tip, during the access procedure and is designed and configured to move the needle in response to needle-guidance commands so as to penetrate the patient and access the targeted anatomical structure.

BRIEF DESCRIPTION OF THE DRAWINGS

For the purpose of illustration, the accompanying drawings show aspects of one or more embodiments of the invention(s). However, it should be understood that the invention(s) of this disclosure is/are not limited to the precise arrangements and instrumentalities shown in the drawings, wherein:

FIGS. 8A through 8C are enlarged isometric views of the needle-manipulation system of the example AVAD of FIGS. 7A and 7B from differing vantage points to highlight differing features of the needle-manipulation system;

FIG. 9A is a series of enlarged partial views of the needle-thrusting system of the AVAD of FIGS. 7A and 7B;

FIG. 9B is an enlarged isometric view of the cammed member of the needle-thrusting system as shown in FIG. 9A;

FIG. 10 is an exploded view of an example AVAD illustrating an example cleaning/disinfecting/sterilizing plan for the AVAD;

DETAILED DESCRIPTION

Figure 1A:
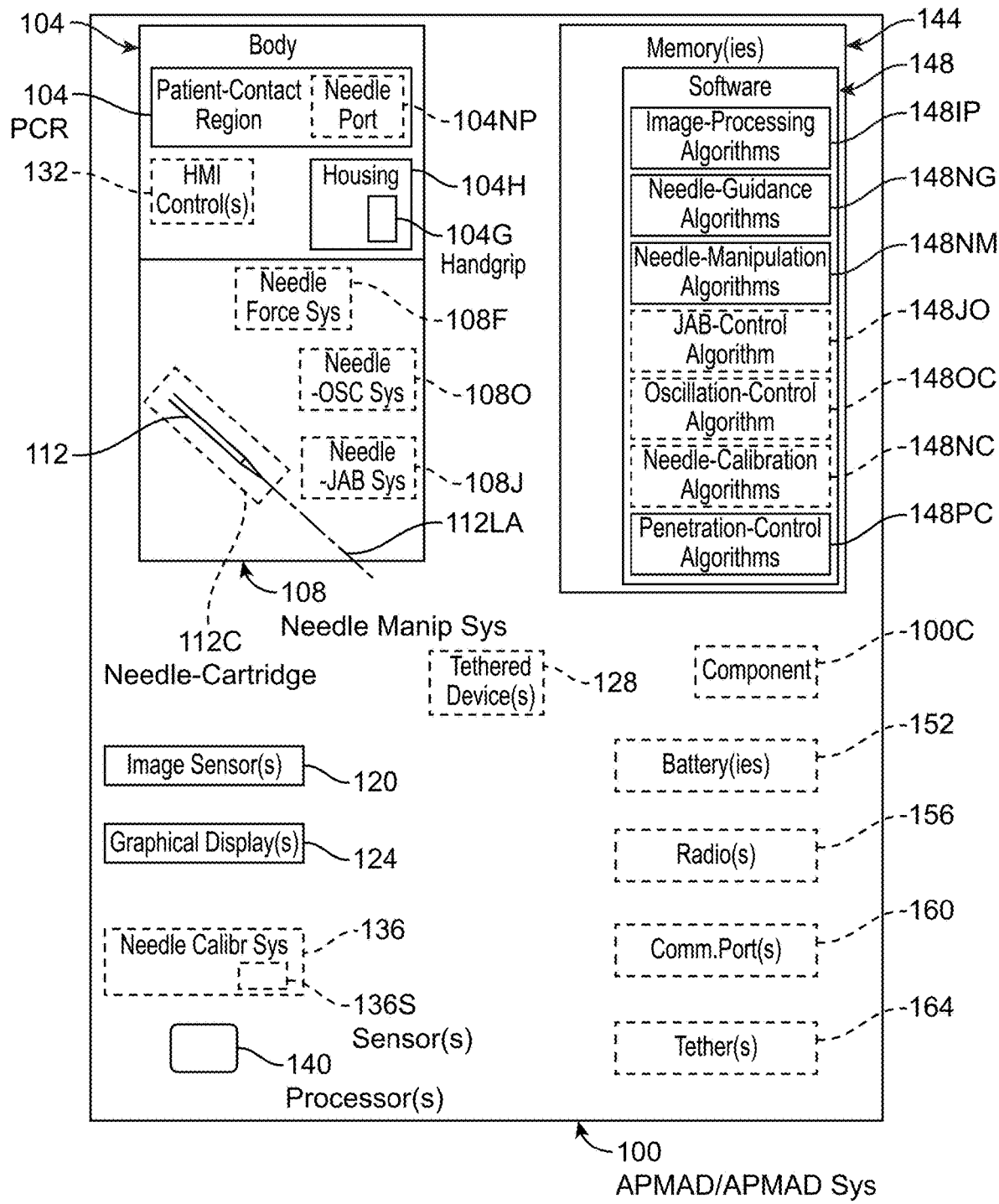
FIG. 1A is a high-level block diagram of an example automated penetrative medical access device (APMAD) and an example APMAD system of the present disclosure.

Some aspects of this disclosure are directed to penetrative medical access devices, for example, automated penetrative medical access devices (APMADs), that are handheld, ergonomic, and simple to operate. Embodiments of an APMAD of the present disclosure can be adapted and configured, for example, to provide automated vascular access devices (AVADs) that automate the two most challenging and skill-intensive steps in vascular access, namely: (1) identification of a suitable blood vessel and (2) needle guidance and penetration into the vessel. An AVAD of this disclosure can enable medical personnel, such as emergency medical technician (EMT) first responders, hospital helicopter crews, battlefield medics, and other healthcare providers to achieve rapid and reliable vascular access without the need for vast training and experience in vascular-access techniques. An AVAD of this disclosure can also assist physicians and other trained providers in situations of difficult but non-urgent vascular access. An APMAD of the present disclosure could also be used for automating other medical procedures such as decompression of cardiac tamponade and pneumothorax, as well as drainage of pyothorax and abscesses, among other things. Essentially, an APMAD of the present disclosure has the potential to automate access to any lumen, cavity, or other anatomical structure in a human or animal body that can be visualized using a suitable imaging modality, such as ultrasound (US).

While much of this disclosure focuses on automating some or all of the various steps of a penetrative medical procedure, such as identifying a targeted anatomical structure, determining a pathway for the needle tip to effect the penetrative medical procedure, and manipulating the needle/needle tip so as to perform the penetrative medical procedure, among others, some embodiments of an APMAD of the present disclosure allow a user to perform one or more of these and/or other steps manually using one or more user controls of the APMAD. In some embodiments, the APMAD may be configured to allow the user to switch between any one or more automated operations and any one or more manual operations corresponding to the automated operation(s).

For example, in some embodiments full automation may be a default setting, but the APMAD may be configured to allow the user to "override" one or more of the automated operations, such as the automated determination of the targeted anatomical structure, the automated determination of the targeted needle-tip location within the targeted anatomical structure where the APMAD should direct the needle tip, and/or the automated generation of needle-manipulation commands. In an example, the user may select the targeted needle-tip location, for example, using onscreen real-time selection techniques (e.g., using a joystick that controls the location of an onscreen cursor) in a manual targeted needle-tip location mode. Once the user has selected (and optionally confirmed) a desired targeted needle-tip location, the user may then instruct the APMAD (e.g., using one or more suitable user controls (hard and/or soft) to begin automatically generating needle-guidance commands that cause the APMAD to automatically guide the needle tip to the targeted needle-tip location.

In another example, the user may manually identify a targeted anatomical structure to the APMAD and then allow the APMAD to automatically determine a targeted needle-tip location within the anatomical structure to which the APMAD may automatically guide the needle tip. In some instantiations, the user may identify the targeted anatomical structure to the APMAD, for example, by drawing (e.g., on a touchscreen or using a joystick) a border around the targeted anatomical structure for the APMAD to recognize as the portion of the full displayed image to use in its image-processing algorithms for automatically discerning the boundaries of the anatomical structure and/or automatically determining a targeted needle-tip location within the identified anatomical structure.

In yet another example, the user may use one or more user controls (e.g., soft control(s) and/or hard control(s)) to manually manipulate the needle/needle tip so that the needle tip ends up at the targeted needle-tip location. For example, the user's actuation of the user control(s) may cause the APMAD to generate suitable needle-manipulation commands that cause a needle-manipulation system aboard the APMAD to manipulate the needle/needle tip along a path that the user controls in real-time using the user control(s). In some instantiations, the user may visually identify a targeted needle-tip location on a graphical display of the APMAD that is displaying a real-time image of a region within the patient. Such visual identifier can help the user visually guide the needle tip to the targeted needle-tip location. In some instantiations, the APMAD may automatically visually identify the targeted anatomical structure and/or the targeted needle-tip location. In some instantiations, the user may use one or more techniques, such as a touchscreen drawings technique or a joystick and cursor manipulation technique, to visually define a desired trajectory for the needle tip on the relevant graphical display that is displaying real-time images of the relevant portion of the patient. Those skilled in the art will readily appreciate that these are but several of a variety of possibilities for manual control and/or manual inputs by the user.

GENERAL EXAMPLE

Referring now to the drawings, FIG. 1A depicts an example APMAD/APMAD system 100 of the present disclosure. As used herein and in the appended claims, the acronyms "APMAD" and "AVAD", as well as their word equivalents, denote a handheld device of the present disclosure, regardless of whether handheld device is self-contained or is tethered (wirelessly and/or wiredly) to one or more components located offboard of the handheld device to allow the handheld device to provide its functionalities. For distinguishing between self-contained versions of the handheld device and tethered versions of the handheld device, the word "system" is added for tethered versions. Consequently, each of an APMAD and an AVAD is a self-contained handheld device, and each of an APMAD system and an AVAD system is a multicomponent system in which the APMAD or AVAD, i.e., the handheld device, is tethered to one or more components located offboard of the APMAD or AVAD.

In the example of FIG. 1A, the APMAD/APMAD system 100 of FIG. 1 includes a body 104 having an integral handgrip 104G. As discussed below and exemplified in various ones of the accompanying figures, the integration of the handgrip 104G into the body 104, along with other features of the APMAD 100, allow a user (not shown, but see FIG. 2E) to hold and maneuver the APMAD with a high degree of stability on a patient's body, which is a critical aspect involving needle placement procedures. As will be seen in examples of the APMAD disclosed herein (mostly in the form of AVADs), the handgrip 104G typically allows the user to hold the body 104 with one hand and with a comfortable hand orientation. Typically, the body 104 comprises a housing 104H, with the handgrip 104G being at least partially defined by integrated and/or contoured features, such as features contoured to fit various parts of a user's hand, such as one or more fingers, thumb, thenar webspace, and/or palm, among others.

A needle-manipulation system 108 is engaged with the body 104. As discussed below, the needle-manipulation system 108 moves a needle 112 as needed to perform the desired penetrative procedure, such as vascular access, among others. Depending on the needs of the APMAD/APMAD system 100, the needle-manipulation system 108 may be provided with any number of degrees of freedom of needle manipulation. Example movements of the needle 112 that the needle manipulation system 108 can be configured to provide include, but are not limited to, movement along the longitudinal axis 112LA of the needle, movement along a plane containing the longitudinal axis of the needle, movement perpendicular to a plane containing the longitudinal axis of the needle, rotation of the needle within the plane containing the longitudinal axis of the needle, and rotation that changes the orientation (relative to the body 104) of the plane that contains the longitudinal axis of the needle, among others. The needle 112 may, for example, be replaceable (e.g., as a sterile consumable) or may be part of a replaceable (e.g., a sterile consumable) needle cartridge 112C to simplify maintaining sterility for each patient or use.

In some embodiments, the needle-manipulation system 108 optionally includes one or more of a needle-jab system 108J, a needle-oscillation system 108O, and a needle force-sensing system 108F. When included, the needle-jab system 108J may provide the needle 112 with a quick jabbing motion, for example, when a tip 112T of the needle 112 is just touching or is immediately proximate to an anatomical structure (e.g., blood vessel wall), for example, to overcome the propensity of the anatomical structure to move (e.g., roll and/or tent) in response to movement of the needle. In some embodiments incorporating the needle jab system 108J, the needle-manipulation system 108 may further include the force-sensing system 108F, which may be configured to determine when the needle tip 112T first contacts the anatomical structure at issue. The APMAD/APMAD system 100 may use force-feedback information to control the operation of the needle-jab system 108J. In addition to or in lieu of using force-feedback information to control the needle-jab system 108J, the APMAD/APMAD system 100 may use imaging information to control the operation of the needle-jab system. The needle force-sensing system 108F, if provided, can also or alternatively be used for one or more other purposes, such as determining when the needle tip 112T has penetrated a target anatomical structure, such as blood-vessel wall, among others. The APMAD/APMAD system 100 may use the force-feedback information, when present, to control the manipulation (e.g., advancement, jabbing, and/or oscillation, among others) exclusively or in complement to an imaging information.

When provided, the needle-oscillation system 108O may move the needle tip 112T with an oscillatory, or vibrational, movement to assist with penetrating an anatomical structure, such as a blood-vessel wall, among others. The needle-oscillation system 108O may include any suitable mechanism for creating the oscillatory movements, such as reciprocating linear actuator, an eccentric-weight rotating mechanism, or a rotating cam arrangement, among others. In some embodiments, incorporating the needle-oscillation system 108O, the needle-manipulation system 108 may further include the force-sensing system 108F, which may be configured to determine when the needle tip 112T first contacts the anatomical structure at issue. The APMAD/APMAD system 100 may use force-feedback information to control the operation of the needle-oscillation system 108O. In addition to or in lieu of using force-feedback information to control the needle-oscillation system 108O, the APMAD/APMAD system 100 may use imaging information to control the operation of the needle-oscillation system. In some embodiments, the APMAD 100 may be provided with both the needle-jab system 108J and the needle-oscillation system 108O, optionally also the needle force-sensing system 108F.

As mentioned above, an important feature of an APMAD of the present disclosure, such as the APMAD 100 of FIG. 1A, is a configuration that provides the user with high-stability operation and high-stability engagement with a patient. At least part of the high stability can be due to the body 104 including a relatively large (e.g., relative to conventional vascular-access devices) patient-contacting region 104PCR that the user places into as full a contact as possible with the necessary portion of the patient's body as practicable. As will be seen in examples illustrated in some of the appended figures, the patient-contacting region 104PCR forms the entire "bottom" of the body 104 of the APMAD 100 and may include an optional needle port 104NP so that one or more portions of the patient-contacting region can extend laterally beyond the plane containing the longitudinal axis of the needle 112. Such extension(s) can provide not only additional stability, but in some embodiments can also provide structure that the user can engage with their other hand (i.e., the hand not gripping the body 104 via the handgrip 104G) to assist with maneuvering the body on the patient. These features provide stability and tactile contact between the device and the patient, which is important for accurate needle placement and patient acceptance of the APMAD 100.

Figure 1B:
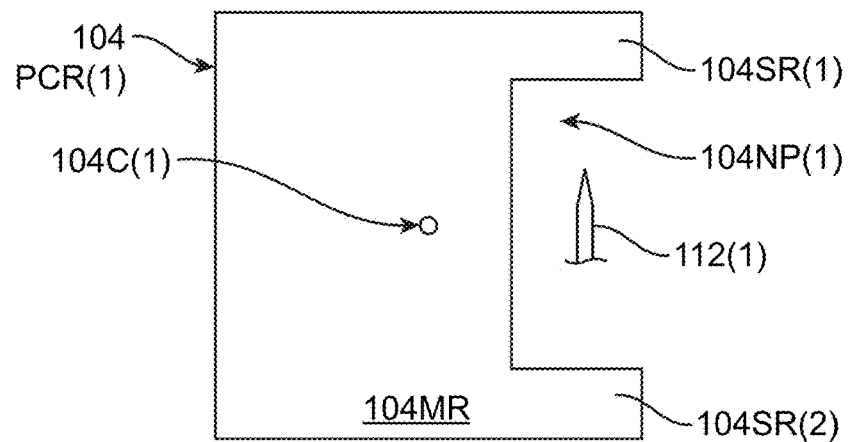
FIG. 1B is an example patient-contacting region of an APMAD of the present disclosure.
Figure 1C:
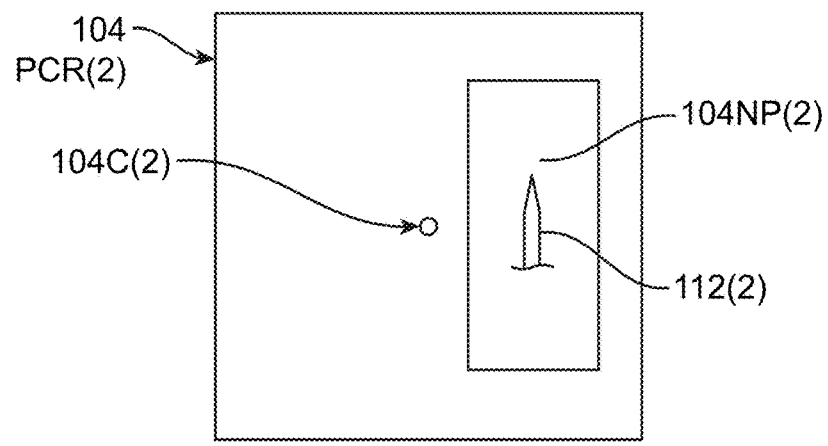
FIG. 1C is another example patient-contacting region of an APMAD of the present disclosure.
Figure 1D:
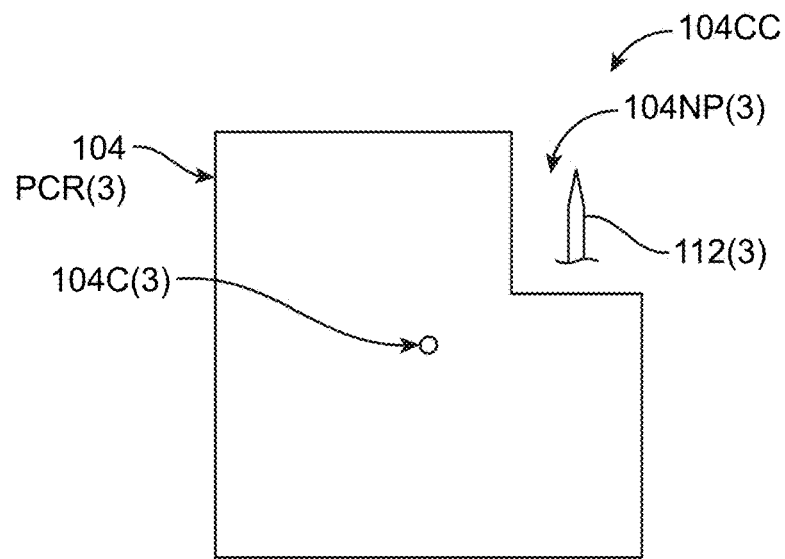
FIG. 1D is yet another example patient-contacting region of an APMAD of the present disclosure.

FIGS. 1B through 1D show example patient-contacting regions 104PCR(1) through 104PCR(3) and corresponding optional needle ports 104NP(1) through 104NP(3). As seen in FIG. 1B, the needle port 104NP(1) in this example is in the form of a notch along one edge of an otherwise generally rectangular patient-contacting region 104PCR(1). This leaves the needle port 104NP(1) flanked by subregions 104SR(1) and 104SR(2) that appear as extensions of a main region 104MR of the patient-contacting region 104PCR(1). FIG. 1C shows an example in which the needle port 104NP (2) is completely surrounded by portions of the patient-contact region 104PCR(2). FIG. 1D shows an example in which the needle port 104NP(3) is in a form that appears as a clipped corner 104CC of an otherwise generally rectangular patient-contacting region 104PCR(3). In each of these examples, each needle port 104NP(1) through 104NP(3) of FIGS. 1B through 1D may, from one perspective, be viewed as a way to locate the needle 112(1) through 112(3), respectively, closer to the center 104C(1) through 104C(3) of the patient-contacting region 104PCR(1) through 104PCR(3) and/or within the perimeter of a fictitious patient-contacting region that does not include the corresponding needle port 104NP(1) through 104NP(3).

Referring again to FIG. 1A, the APMAD/APMAD system 100 also includes one or more imaging sensors, singly and collectively represented as imaging sensor(s) 120. Each imaging sensor 120 may be of any suitable type, such as a US sensor, among others, for generating images of anatomical structures internal to the patient. Fundamentally, there is no limitation on the type of each sensor(s) other than it be able to provide images of anatomical structures internal to the patient, but practically speaking, a US sensor is typically most appropriate due to its safety. In some embodiments, one or more of the imaging sensor(s) 120 may be provided internally to the body 104. In some embodiments, one or more of the imaging sensors 120 may be provided externally to the body 104. In some embodiments, a conventional imaging sensor may be used as one or more of the imaging sensor(s) 120 and may optionally be removably attached to the body 104. In some embodiments, multiple imaging sensors 120 of differing types may be used. In some embodiments, one or more of the imaging sensor(s) 120 may be of either a fixed type or a scanning type or switchable between a fixed type and a scanning type, depending on a particular design.

The APMAD/APMAD system 100 includes one or more graphical displays, singly and collectively represented as graphical display(s) 124. Each graphical display 124 may be of any suitable technology, such as LED-based, LCD-based, laser-diode-based, etc., and may be of any suitable type, such as flat panel, touchscreen, projection, or augmented reality (AR) (e.g., AR headset, AR glasses), among others. In some embodiments, at least one graphical display 124 is integrated into the body 104 or is otherwise physically secured to the body. In some embodiments, any graphical display 124 is provided on one or more tethered devices 128 that is/are wiredly or wirelessly tethered to APMAD 100. Differing examples of location of a graphical display 124 are illustrated in various ones of the appended drawings.

In some embodiments, the body 104 may optionally include one or more human-machine-interface (HMI) controls, singly and collectively represented at HMI control(s) 132 that allow the user grasping the body via the handgrip 104G to control one or more features of the APMAD/APMAD system 100 and/or control one or more functions of the APMAD/APMAD system during a penetrative-access procedure. Examples of physical HMI controls that can be used for each HMI control 132 include, but are not limited to, a joystick button, a push button, a slider, a dial, a trigger, and a toggle, among others. Each HMI control 132 may be placed in any suitable location so as to be actuatable with a desired part of a user's hand, such as their thumb or index finger, among others. If the body 104 is provided with a touchscreen-type graphical display 124, one or more of the HMI controls 132 may be provided as a suitable soft control, such as a soft version of any suitable one of the hard controls mentioned above.

The APMAD/APMAD system 100 may optionally include a needle-tip calibration system 136 for precisely locating the tip 112T of the needle 112, for example, using a completely contactless process. As discussed herein, needles may have variable tolerances that drive inaccuracies in needle-tip positioning. If needed, the needle-tip calibration system 136 can determine the location of the needle tip 112T with a degree of accuracy needed for the APMAD/APMAD system 100 to consistently work properly. In some embodiments, the needle-tip calibration system 136 may include two or more sensors (collectively represented at sensors 136S) to obtain location information regarding the needle tip 112T. As a nonlimiting example, each of the sensors 136S may be imaging sensors, such as visible-light sensors and cameras that obtain, for example, 3D photogrammetric information. Such sensors 136S may be located on the body 104 of the APMAD 100 or may be located remotely from the body. If located remotely, the sensors 136S may be located, for example, on another component 100C, such as a docking station or a cradle for the APMAD 100, among other things. Examples of the needle-tip calibration system 136 and its operation are described below.

The APMAD/APMAD system 100 also includes one or more microprocessors, singly and collectively represented as processor(s) 140, and one or more memories, singly and collectively represented as memory(ies) 144. Each processor 140 may be any suitable microprocessor known in the art, such as a system-on-chip type processor, field-programmable-array type processor, application-specific-integrated-circuit type processor, or general purpose microprocessor, among others. If multiple processors 140 are provided, they may be of the same type or differing types. Control of the APMAD/APMAD system 100 may be centralized or distributed as desired for a particular implementation. Each memory 144 may be any suitable type of persistent or non-persistent memory and may be provided for any purpose, such as cache memory, short-term storage memory, and long-term memory. Each memory 144 may be located locally to or remotely from a corresponding processor 140, as a particular architecture may provide. Fundamentally, there are no limitations on the type(s) and number of processor(s) 140 and the type(s) and number of memory(ies) 144, and anyone skilled in the art will readily be able to implement any suitable processor(s) 140 and memory(ies) 144 using only routine skill in the art. It is noted that each memory 144 is a hardware memory and that the term "machine-readable storage medium" is used herein and in the appended claims to refer to the memory(ies) 144 singly or in any combination with one another and specifically excludes transient signals, such as signals present on carrier waves and/or in pulses of energy, such as light or sound pulses, among others.

The memory(ies) 144 contain(s) the firmware and/or software necessary for the APMAD/APMAD system 100 to provide the requisite/desired functionalities. In any case, the software is embodied in suitable machine-executable instructions, as is well known in the art. Regarding software specific to automated penetrative access, which is represented collectively at software 148, example algorithms that this software may embody include, but are not limited to: image-processing algorithms 148IP for processing images from the imaging sensor(s) 120 to locate and track target anatomical structures; needle-guidance algorithms 148NG for determining a path for the needle tip 112T for achieving a goal of the needle penetration; needle-manipulation algorithms 148NM for moving the needle tip in accordance with the determined needle path; an optional jab-control algorithm 148JC for controlling jabbing movements of the needle tip; an optional oscillation-control algorithm 148OC for controlling oscillatory motion of the needle tip; optional needle-calibration algorithms 148NC for calibrating a location of the needle tip; and penetration-control algorithms 148PC for controlling the overall execution of the needle-penetration process, for example, in response to one or more user inputs; among others, including algorithms for performing any of the computational techniques disclosed herein.

Figure 14A:
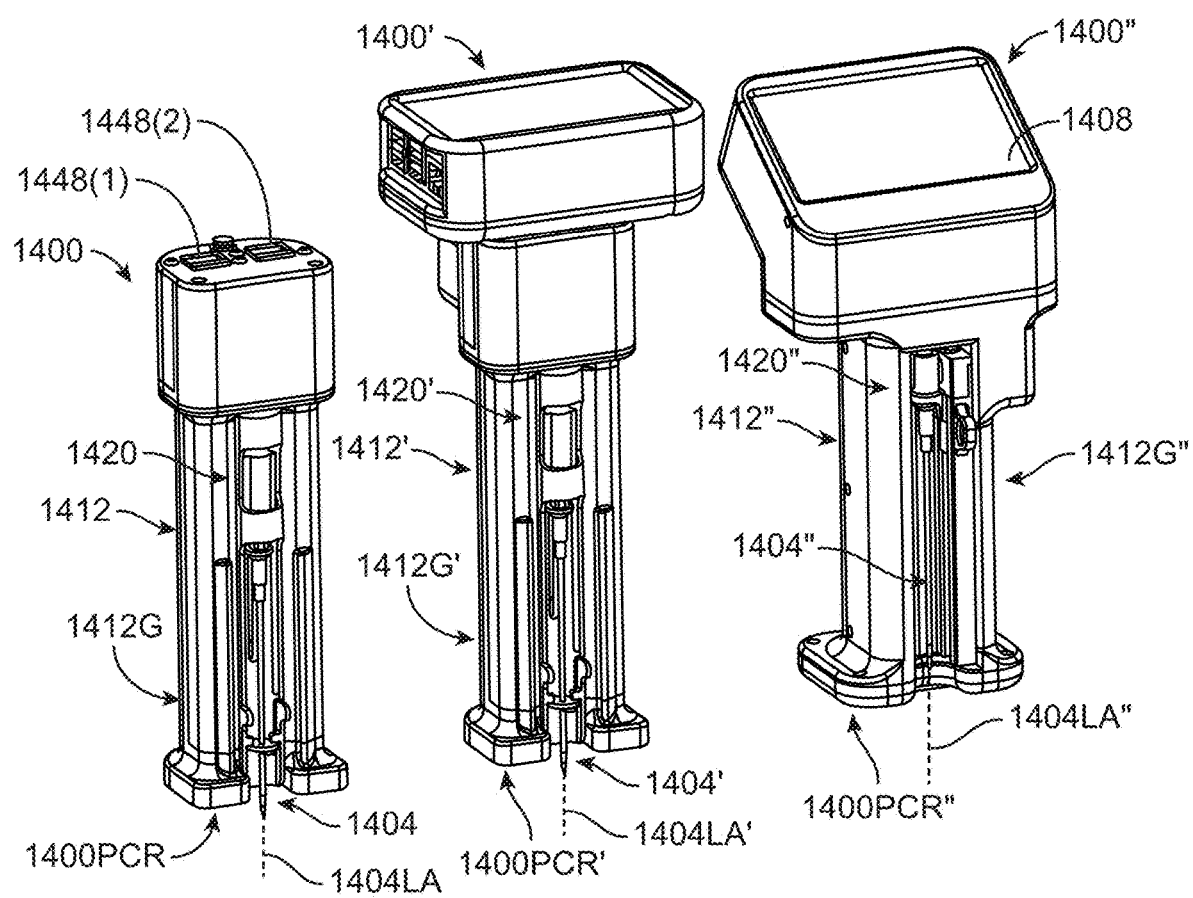
FIG. 14A is an isometric view of three pneumothorax (PTX)-centric APMADs of the present disclosure located side by side, ranging from a minimal-onboard-feature version (lefthand side), a fully self-contained version (righthand side), and a middling version (center) having more features than the minimal-onboard-feature version but fewer features than the fully self-contained version.
Figure 14B:
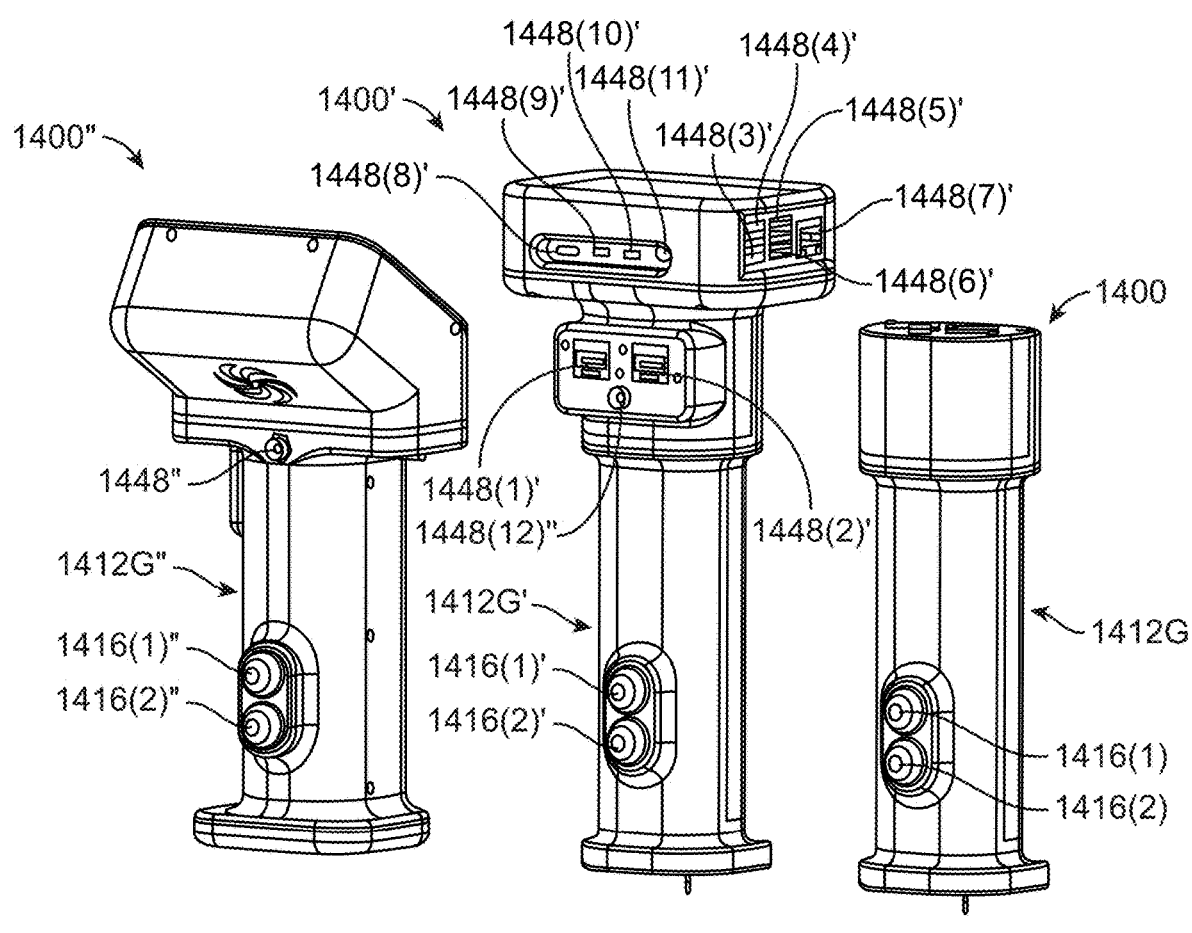
FIG. 14B is an isometric view of the three PTX-centric APMADs of FIG. 14A from a vantage point different from the vantage point of FIG. 14A, showing the opposite side of each of the APMADs.

It is noted that in some cases, a targeted anatomical structure is a natural anatomical structure that is a normal part of the patient's anatomy, while in some cases a targeted anatomical structure is not a natural anatomical structure, such as an anatomical structure caused by an injury or other event. An example of the latter is a cavity caused by pneumothorax (PTX). As discussed below, software of an APMAD/APMAD system of the present disclosure, such as APMAD/APMAD system 100 of FIG. 1A, can be trained to detect a PTX cavity and control the APMAD accordingly. Three example PTX-centric APMADs 1400, 1430, and 1460 are shown in FIGS. 14A and 14B and described below.

The APMAD/APMAD system 100 may include a variety of other components to make the APMAD/APMAD system fully functional. Examples of such other components include, but are not limited to one or more batteries 152 and, when the embodiment at issue is a multi-component APMAD system 100, one or more pairs of radios 156 for wireless communication between components when the embodiment includes wireless tethering and one or more pairs of communications ports 160 and one or more wired tethers 164 when the embodiment includes wired tethering, among other things. Those skilled in the art will readily appreciate the additional components that may be needed to make the APMAD/APMAD system 100 under consideration fully functional.

The foregoing description of the APMAD/APMAD system 100 of FIG. 1A is general to any sort of penetrative procedure. As discussed above in the Background section, one type of such procedure involves vascular access. Because of the importance and widespread occurrence of vascular-access procedures, the following disclosure focuses primarily on vascular access and AVADs/AVAD systems. However, it should be apparent from other portions of this disclosure that the present disclosure is certainly not so limited in scope.

Vascular Access: General

Both traditional and automated vascular access procedures require several functions and/or tasks and are largely based on the well-known Seldinger (guide wire insertion) technique with a few variations depending on the specific situation. For example, central venous catheter (CVC) access typically involves inserting a needle, then inserting a guidewire through the needle and into the vessel, followed by placing a catheter over the guidewire. However, peripheral intravenous (PIV) access typically involves only needle insertion, followed by catheter insertion over the needle. The common steps and methods for vascular access include:

Visualizing the vessel. This is typically accomplished with a US probe with brightness-mode (B-mode) imaging to identify a vessel. Other imaging modalities, such as modalities using near infrared light, can be used to visualize shallow vessels but are generally not able to visualize deeper vessels.

Vessel Identification. For traditional PIV or CVC, the US probe can be pressed onto a patient's skin to illicit visual differences between an artery and a vein (e.g., veins will compress/collapse under light pressure). Doppler and/or pulse-wave US modes are often used to observe the blood flow direction, and hence distinguish between a vein or artery. For automated methods, variations and combinations of image processing, neural networks, and artificial intelligence (AI) may be used to identify a vessel to access. Once identified, Doppler and pulse-wave US modes can be used to confirm that the identified vessel is in fact a vessel and whether it is a vein or artery.

Vessel Targeting/Tracking. Minor movements of the US probe on the surface of the skin will cause the identified vessel to change position on the US display. For traditional CVC and PIV, the clinician manually adjusts the needle position and advancement based on observations of these movements. Likewise, automated vascular access requires vessel targeting and tracking which can be accomplished with object classical detection/tracking methods.

Needle/Device Calibration. Traditional vascular access does not need any sort of needle calibration or pre-examination before use. However, with automated vascular access, knowledge of the location of the needle tip is critical to a successful vascular access. Unfortunately, current needle cartridge manufacturing tolerances are generally too large to provide consistent and accurate results. Consequently, some embodiments of an AVAD of the present disclosure utilize a needle-tip tracking and/or calibration protocol. Such a protocol can include measuring actual needle position either before or during access and using that information to adjust the needle so as to advance the needle tip to the desired position.

Needle Manipulation. Both traditional and automated vascular access requires several degrees of freedom when advancing and guiding the needle. With perfect alignment and no relative movement, only one degree of freedom is needed—simply advance the needle to the vessel. In practice, however, multiple degrees of freedom are needed to account for inadvertent movement of the device or vessel as the needle is advanced. Clinicians will often retract the needle and reposition it if it appears that these movements have occurred as the needle is advanced to the vessel, and multiple attempts are common for difficult venous access (DIVA) patients.

Needle Penetration. Once the needle tip is contacting the outer wall of the targeted vessel, a rapid/sudden thrusting, or jabbing, motion by the clinician is often needed to penetrate the vessel wall to minimize the chance that the vessel will roll, tent, and/or otherwise move after the needle contacts the vessel and the clinician continues to advance the needle. Relatedly, in some embodiments current automated vascular access can benefit from needle vibration/oscillation and/or jabbing motion as the needle is advanced to and into the vessel. These movements reduce the needle-cutting forces and help to reduce vessel rolling and/or other movements as the needle approaches the vessel. Also, needle penetration can be measured/observed by a reduction in force to advance the needle, blood/pressure flashback from the needle, or visualization of the needle tip into the vessel.

In some embodiments, an AVAD of the present disclosure is designed to be portable, handheld, and simple to operate by personnel without advanced vascular access training or US training. Some embodiments of AVADs of the present disclosure combine two or more of electromechanical needle actuation, built-in US, a built-in graphical display, an onboard user interface (UI), automated needle vibration, automated needle jabbing, and real-time neural network guidance to automate target vessel identification followed by automated needle insertion into a blood vessel. Once the AVAD inserts the needle into the vessel, a standard catheter can be placed as needed. Development of the present AVAD technology was motivated by the need for rapid and reliable vascular access, for example, in emergency medicine situations such as peripheral IV access, central venous access, and arterial access for procedures such as resuscitative endovascular balloon occlusion of the aorta (REBOA), although, as noted above, it can also be used more generally for a wide array of medical applications such as decompression of cardiac tamponade and pneumothorax, as well as drainage of pyothorax and abscesses, and targeted delivery of therapeutic drugs, among others.

In some embodiments, an AVAD of the present disclosure can incorporate any one or more of at least six innovative features to automate vascular access in both arteries and veins of a patient's extremities and/or torso, and can do so, if necessary, without the need for a tourniquet. In some embodiments, one or more of the following six example features can differentiate an AVAD of the present disclosure from other devices that attempt to assist or automate vascular access.

1. Needle jab, for example, when the needle tip contacts the targeted vessel. This movement generally mimics the challenging and skill-intensive technique required during conventional manual US-guided vascular access to pierce the vessel—overcoming vessel "tenting" and vessel rolling. "Tenting" is the deformation of the anterior vessel wall by the needle tip without penetration of the vessel. If tenting is severe, as occurs in some hypotensive patients, the needle, when it finally penetrates the vessel, penetrates both the anterior and posterior wall, resulting in failed vessel cannulation and, in many cases, bleeding into surrounding tissues.

2. A compact and stable handheld device that, in some embodiments, separates the AVAD needle actuator, including the US probe, from the electronics, power supplies, and the graphical user interface (GUI). In some embodiments, physical separation of these components leads to a low center of gravity for the handheld device, which significantly enhances the device stability when in contact with the patient. In other embodiments, an AVAD of the present disclosure is self-contained, meaning that it contains all of the hardware and software needed to provide all of the functionalities disclosed herein; all that is needed is for a technician to maneuver and operate the AVID. In many embodiments, both self-contained embodiments and tethered (either wirelessly or wiredly) embodiments that communicate with offboard components, the center of gravity for the AVAD is very low and the contact area with the patient skin is large relative to conventional automated devices. This provides such AVADs with excellent stability and eliminates the need for a separate support mechanism—leading to a truly effective handheld device. Important to handheld operation, some embodiments of an AVAD of the present disclosure can be operated with physical buttons and/or other tactile control(s) located on the handheld device so that the user can use one or both of their hands to place/stabilize the AVAD on the patient's body and move the AVAD stably and precisely as needed.

3. Powerful and efficient neural networks process real-time ultrasonography to identify suitable blood vessels for access.

4. Vessel tracking algorithms using computer vision techniques to locate and track a vessel identified by the neural network as the device is fanned over the anatomy.

5. Doppler US as an optional second mechanism to independently classify and confirm the vessels identified by the neural network as veins or arteries.

6. Non-contact needle calibration to locate the needle tip relative to the US probe to overcome the manufacturing variability observed with catheter needles while maintaining needle sterility.

Vascular Access: Example AVADs and AVAD Systems

This section describes example AVAD/AVAD system embodiments of an APMAD/APMAD system of the present disclosure, such as the APMAD/APMAD system 100 of FIG. 1A, as well as example components of such embodiments. However, those skilled in the art will readily understand that the basic principles described herein can be applied more broadly. As described herein, some embodiments of an APMAD of the present disclosure combine electromechanical needle actuation, built-in ultrasonography, neural networks, and anatomical structure tracking algorithms to automate needle insertion into an anatomical structure, followed, in some embodiments, by manual placement of a catheter.

In the context of an AVAD being used to insert a needle and a catheter into a blood vessel, once the AVAD inserts the needle into the vessel, in some embodiments the operator manually advances a catheter guidewire through the needle and into the vessel. The user may then activate the AVAD to retract the needle, leaving the guidewire inserted in the vessel. At this point, depending on the specific vessel, a catheter can be slid over the guidewire and into the vessel, for example, using the Seldinger technique. The subsections below provide more details of the examples in the context of an AVAD. While these subsections, and indeed much of the present disclosure, focus on a blood vessel as the target anatomical structure, those skilled in the art will readily understand how to generalize the subject matter of these subsections to other types of anatomical structures and their corresponding lumens, cavities, or other parts that will receive the needle and/or a medical device or instrument that the needle may carry or deploy.

Vessel Visualization

An AVAD of the present disclosure can use, for example, either a conventional handheld US probe or a built-in US sensor to visualize a target vessel. As an example of the former (see, e.g., FIGS. 7A and 7B), a US probe that may be used is a handheld GP-C01 US probe from Interson (Pleasanton, California) with a 3.5-7.5 MHz range and a 60° scan angle. In another example, an AVAD of the present disclosure can utilize, for example, a linear array of US elements mounted on a pivotable mount and coupled to a housing via a coupling film or sealed in a liquid bath (see, e.g., FIG. 6B). Alternatively to a mechanical scanning arrangement, a US sensor having a controlled scanning beam can be used.

Vessel Identification

An example AVAD identifies vessels using neural networks and contains a "object-detection and segmentation" neural network that was trained using video US datasets obtained during anesthetized swine experiments using the example AVAD. Also included in the AVAD is an "object tracking" algorithm that locks onto and tracks a vessel identified by a deep convolution neural network (DCNN) as the US probe is fanned over the anatomy. This real-time object tracking compensates for small movements of the patient and/or operator, which are inevitable in a hand-held device.

DCNN selection: A mask-recursive convolutional neural network (RCNN), based on the work of Oskar, Ullah, and Kannala (2019), was selected. Their work compared segmentation of Unet-DCNN and mask-RCNN on a biomedical imaging problem (cell nuclei segmentation) with relatively small datasets (~800 images), and they observed that the mask-RCNN performed better than the Unet-DCNN with fewer false positives—important for vascular access. Other DCNNs can be used depending on the results achieved.

DCNN training: In an experiment, the mask-RCNN was trained using 789 swine vascular images that were extracted and labeled by a medical US expert from a limited swine dataset. Five videos included blood vessels at 4.5 cm depth and another five included vessels at 2.0 cm depth. Two videos (one at each depth) were selected as holdouts for DCNN performance testing. One contained both an artery and a vein, and the other a single artery. The remaining eight videos were used to train the mask-RCNN. This resulted in 718 training images and 71 holdout images that included arteries and veins over a range of depths. DCNN training utilized an optimizer and employed a cross-validation strategy to classify each pixel in the image as vein, artery, or soft tissue.

DCNN evaluation: The trained mask-RCNN was used to predict veins and arteries in the 71 holdout validation images. Evaluation utilized the common objects in context (COCO) dataset, which uses an industry standard set of metrics for evaluating object-detection and instance segmentation DCNN architectures. A COCO scoring reference implementation was used to calculate benchmark scores on the trained mask-RCNN. The metrics provided by the COCO dataset is built around specific calculations of a trained model's precision and recall, which are in turn based on the intersection over union (IoU) method to determine if the prediction matches the actual vessel.

The IoU method uses an overlap threshold to determine if the DCNN prediction correctly identified a blood vessel. Results from one or more IoU thresholds are combined to produce a mean average precision (mAP) and a mean average recall (mAR), which are comparable to the metrics of specificity and sensitivity.

Figure 4:
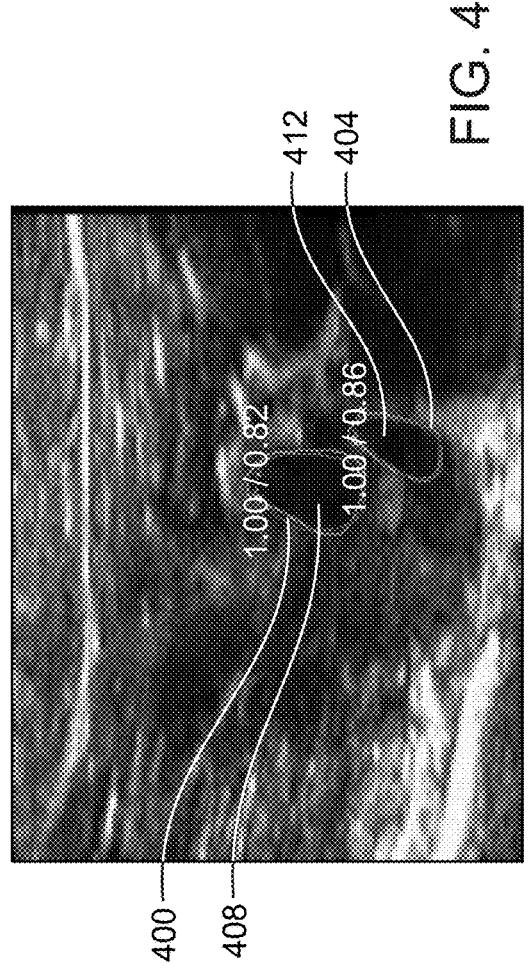
FIG. 4 is an enhanced ultrasonic image of a patient's arm as acquired by an AVAD of the present disclosure, showing an ultrasonic image overlaid with AVAD-generated information.

DCNN results: The DCNN was shown to differentiate blood vessels from other soft tissue with an average precision of 94.5% and an average recall of 84.0% with the limited dataset. An example mask-RCNN prediction is shown in FIG. 4, where the green (or lighter gray) line is the expert-labeled blood vessel and the red (or darker gray) line is the mask-RCNN prediction of the blood vessel. It is clear from the example image that the mask-RCNN can detect blood vessels and determine their centroids with good precision. Additional vessel confirmation tools such as DCNN persistence and Doppler US can be used to achieve the required specificity and sensitivity for the AVAD.

Vessel Targeting/Tracking

An AVAD/AVAD system, or more generally an APMAD/APMAD system may use object tracking to track targeted vessels. Object tracking is a computationally efficient computer vision technique that is used to identify and locate a known object in a video or image. For vascular access, an object-tracking algorithm is computationally more efficient than solely relying on the DCNN to continuously update vessel predictions. This is because object tracking uses a priori knowledge of the vessel to track its position as the US probe is fanned over the anatomy. For vascular access, the a priori vessel knowledge is gained from the DCNN predictions, which include the size, shape, and location of the vessel. However, for vascular access, object tracking alone would be vulnerable to sudden anatomic changes of a vessel within the anatomy—vessels can change size, shape, and direction. As a result, a combination of DCNN predictions and object tracking is required to identify and track the blood vessel in a computationally efficient manner. A computationally efficient object-tracking algorithm was implemented on the AVAD to track the DCNN-identified vessel as it moves and distorts in the US image when the AVAD is fanned over the anatomy. An example of the vessel tracking algorithm, with output shown in FIGS. 3A through 3D, illustrates how the object tracking algorithm tracks (e.g., asterisk 300) the vessel centroid (e.g., target location) as the AVAD is fanned over the anatomy.

Needle Manipulation and Guidance

Several embodiments of the needle-manipulation system have been developed to achieve the demanding requirements for a handheld AVAD. These embodiments are described below in some detail.

Figure 2A:
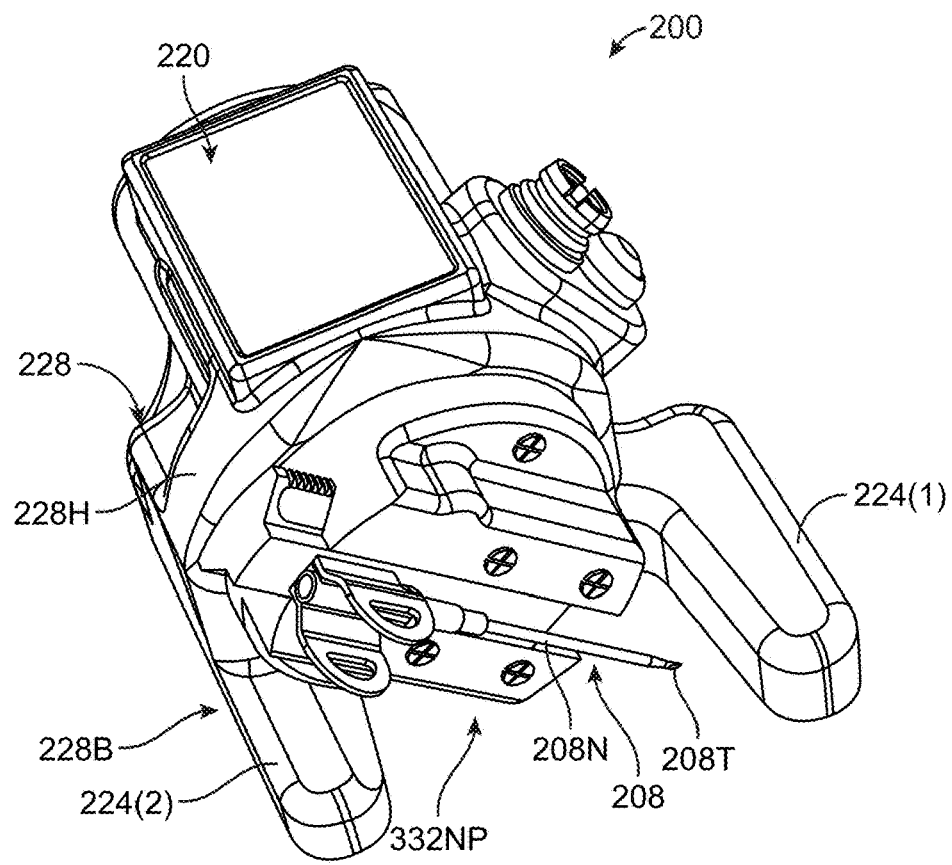
FIG. 2A is an isometric view of an example automated vascular access device (AVAD) of the present disclosure, highlighting the needle-manipulation system and the graphical display, among other features.
Figure 2B:
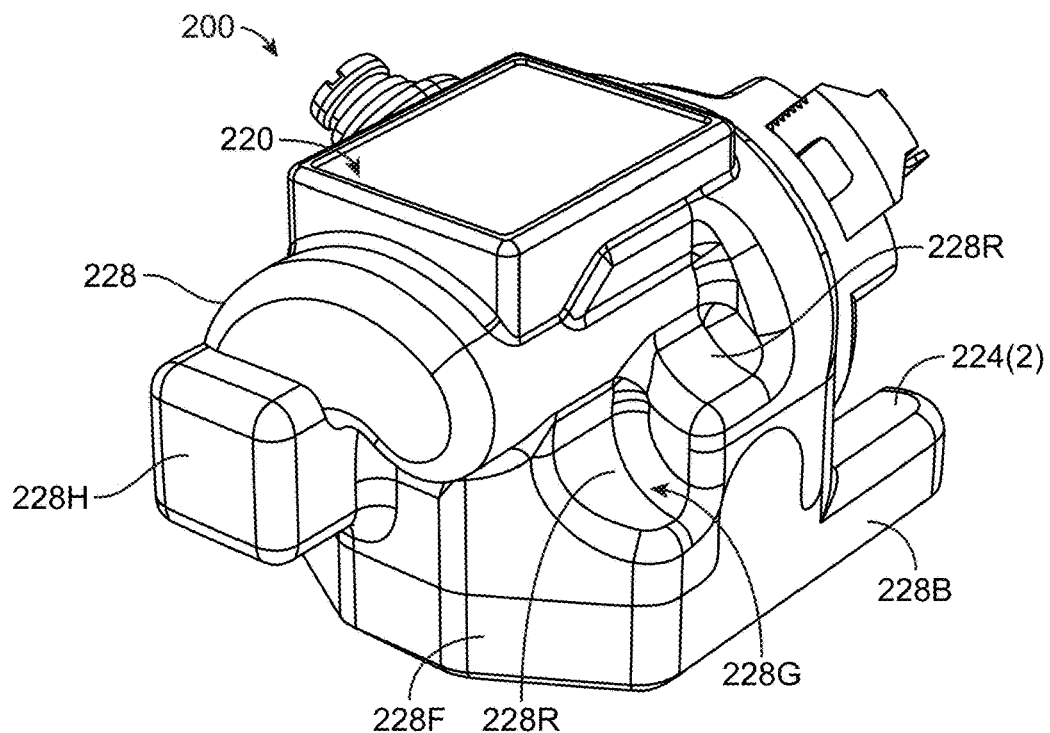
FIG. 2B is an isometric view of the AVAD of FIG. 2A, highlighting the handhold region and other features.
Figure 2C:
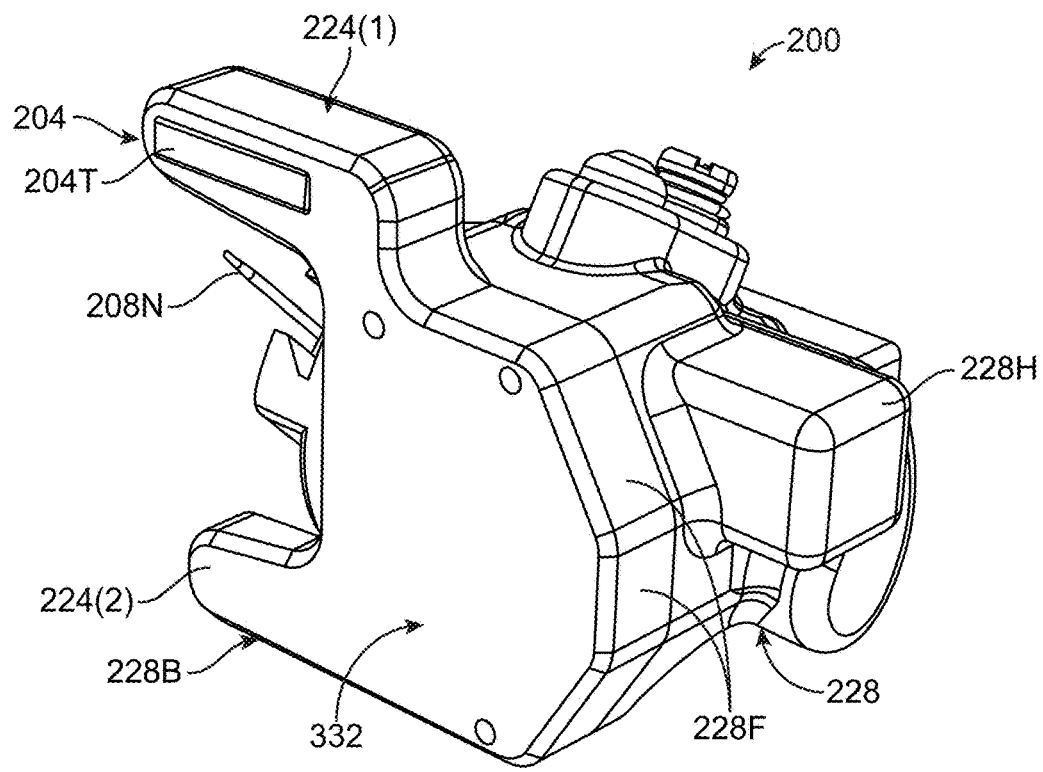
FIG. 2C is an isometric view of the AVAD of FIGS. 2A and 2B, highlighting the patient-engaging regions and other features.

FIGS. 2A through 2D illustrate an example self-contained AVAD 200 of the present disclosure. As seen in these figures, the AVAD 200 comprises an integrated US device 204 (FIG. 2C), a sterile needle cartridge 208, a needle-manipulation system 212, a set of user controls, here a joy button 216(1) and a push button 216(2), and a graphical display 220, all housed in a compact hand-holdable device. The AVAD 200 includes a US transducer 204T (FIG. 2C) mounted in a first extension 224(1) of the base 228B, which may also provide a place for the user to optionally touch or grip the AVAD to assist with positioning the AVAD on a patient's body (not shown, but see FIG. 2E). In this embodiment, the first extension 224(1) positions the US sensor 204 properly relative to the needle 208N and the needle-manipulation system 212, with the electronics (not shown) for the US sensor located in the base 228B of the main body 228 of the AVAD 200. The embodiment shown also shows the base 228B as including a second extension 224(2) that also optionally allows the user to touch or grip the AVAD 200 with the user's hand that is not gripping the AVAD via the hand-gripping features 228G on the upper portion of the main body 228. The region between the first and second extensions 224(1) and 224(2) and the base 228B of the main body 228 may be considered to define a needle port 332NP in the patient-contacting region 332 (FIG. 2C). Also in the base 228B in this embodiment is an inductive charging coil (not shown) and a battery pack (not shown) that allows the AVAD 200 to be used in a standalone manner or wirelessly. Regarding the latter, the AVAD may further contain wireless communication capabilities (e.g., RF radio(s), IR transceivers, etc.) (not shown) to allow it to transmit and receive information to and from one or more other components (not shown) of an AVAD system.

Above the circuitry (not shown, such as the above-mentioned US electronics) in the base 228B of the AVAD is the needle-manipulation system 212 that, in this example, provides three axes of needle positioning. In addition to the three axes of needle positioning is a built-in needle-oscillation system (not visible) and a needle-jab system (not visible), which can assist in needle insertion and vessel wall penetration as discussed above. The needle-oscillation system and the needle-jab system may, for example, be the same as or similar to the needle-oscillation system and the needle-jab system shown in FIGS. 9A and 9B and as described herein. In the embodiment shown in FIGS. 2A through 2D, the housing 228H that encloses portions of the needle-manipulation system 212 contains several facets 228F and recesses 228R to assist a user's grip when hand-holding the AVAD 200.

Figure 2D:
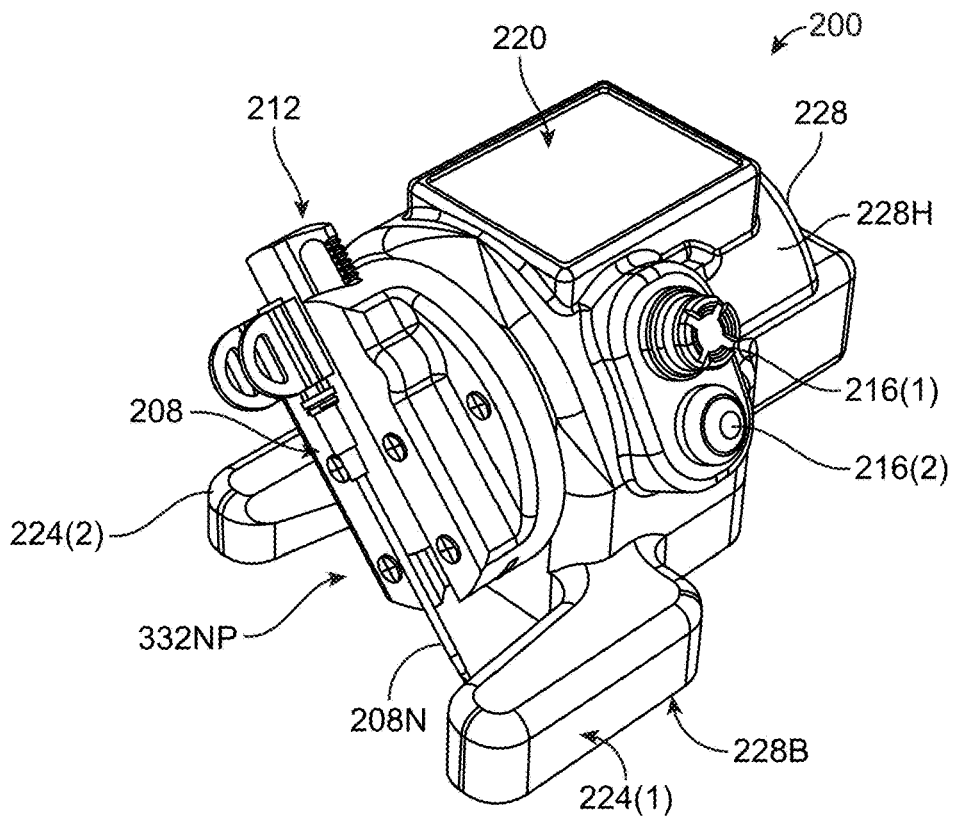
FIG. 2D is an isometric view of the AVAD of FIGS. 2A through 2C, highlighting the needle-manipulation system, the graphical display, and the physical user interface (UI) controls, among other features.

In this embodiment, the housing 228H also houses the graphical display 220 (e.g., a touchscreen display), which shows real-time US images, vessel identification, and status information. A control area (not shown) of the display provides the user with a means to adjust various operating parameters of the AVAD 200. In addition to the graphical display 220, the joy button 216(1), with integrated push button, and the pushbutton 216(2) allow the user to control the AVAD and vessel targeting in a more tactile way than the touchscreen of the graphical display. The sterile needle cartridge 208 is attached to the needle-manipulation system 212 and provides a flexible and interchangeable configuration to allow the AVAD 200 to use simple sterile cartridges and also to allow the AVAD to be used for various vascular access tasks. As best seen in FIGS. 2A and 2D, this embodiment utilizes a peripheral-access cartridge as the sterile needle cartridge 208, but another example is a central access cartridge (not shown) and "J-wire" assembly that can be alternatively installed to change/extend the capabilities of the AVAD 200.

Figure 2E:
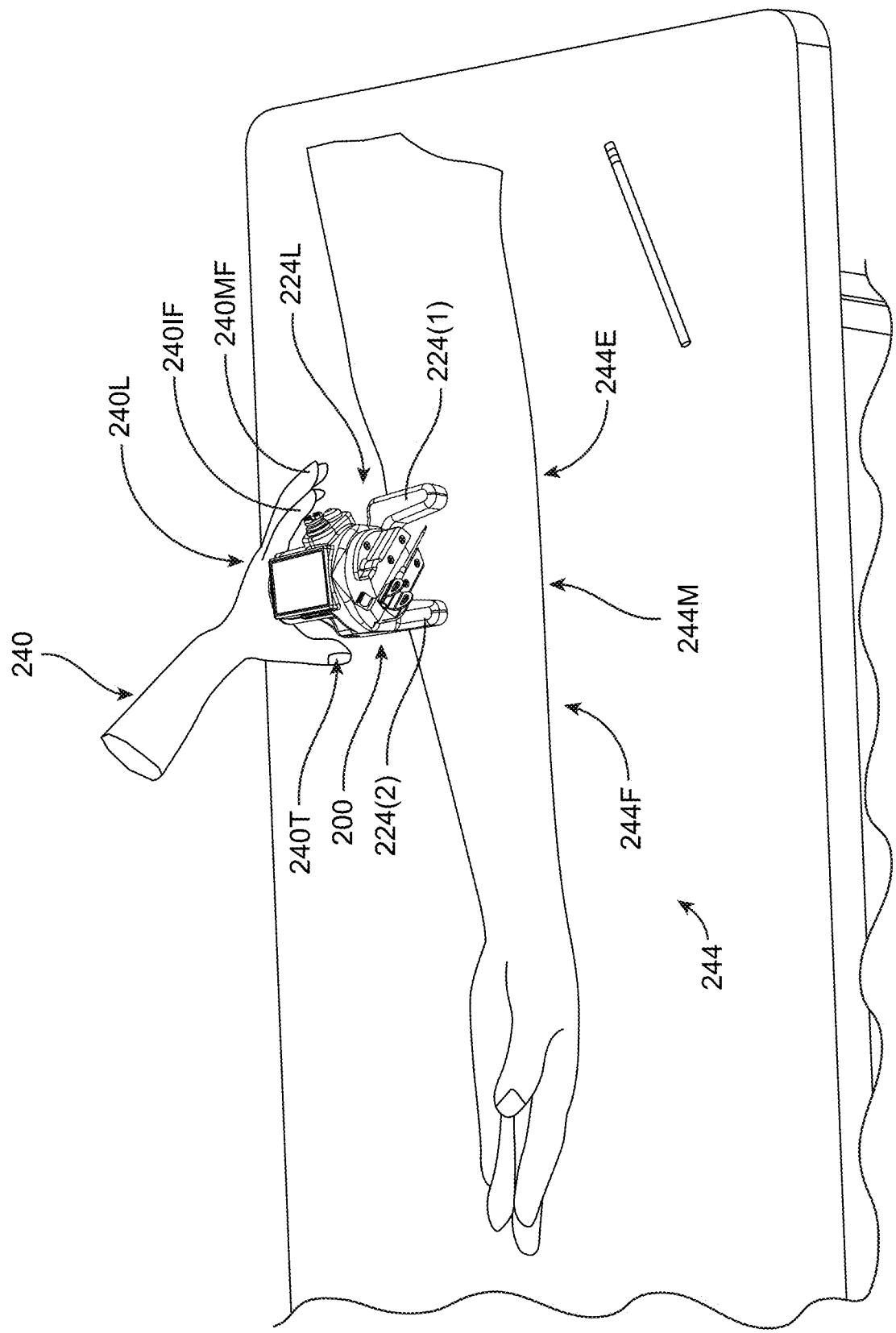
FIG. 2E is an isometric view of the AVAD of FIGS. 2A through 2D engaged with a human arm during use of the AVAD to access a vein in the antecubital fossa of the arm.
Figures 3A, 3B, 3C, 3D:
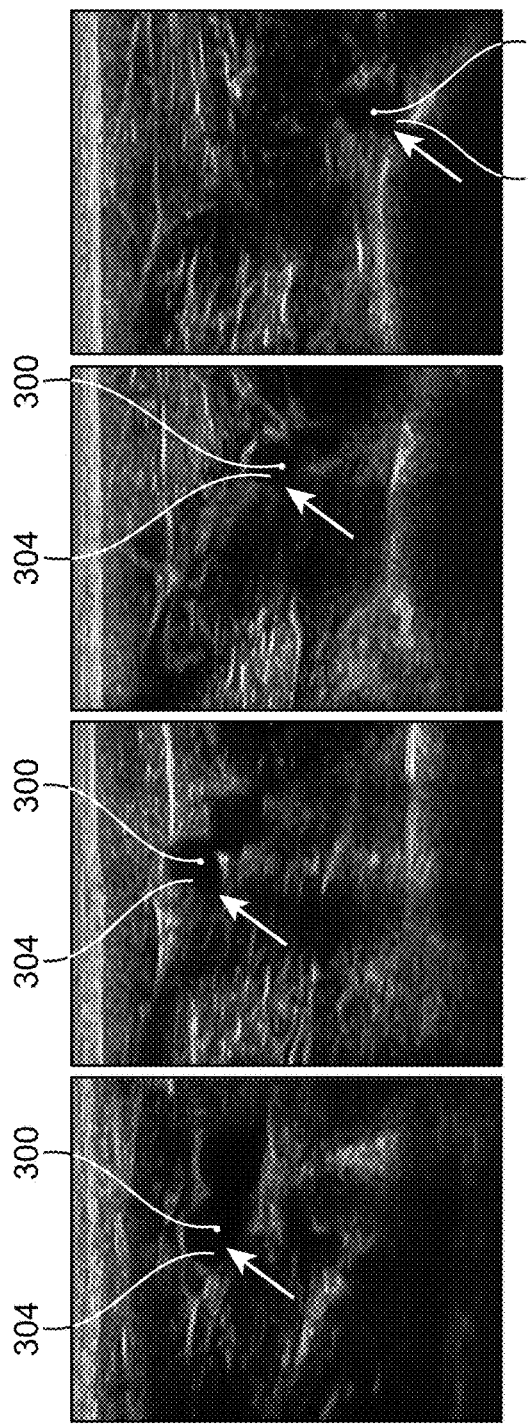
FIGS. 3A through 3D are ultrasonic images of a patient's arm as acquired by an AVAD of the present disclosure, showing features within the arm.

Referring now to FIG. 2E, and also to FIGS. 2A, 2B, and 2D, FIG. 2E illustrates a user 240 gripping the AVAD 200 with their left hand 240L using one of several possible grip configurations to grasp the AVAD with a side grasp, which is defined by the palm of the user's hand being located laterally adjacent to the AVAD while the user is grasping the AVAD. Although not shown, the user 240 may optionally use their right hand (not shown) to grasp either of the second extension 224(2) or the first extension 224(1) (FIG. 2A), or even both of the first and second extensions in sort of a C-shaped clamping grasp from the right lateral side, for increasing the stability and/or maneuverability of the handheld device on the patient's body. FIG. 2E illustrates the AVAD 200 in contacting engagement with a forearm portion 244F of a human left arm 244 between the medial and lateral portions 244M and 244L, respectively, of the forearm proximate to the elbow joint 244E. In this example, the AVAD 200 is oriented relative to the target vessel (not shown; here, a vein) so that the needle tip 208T (FIG. 2A) enters the vessel generally in the direction of blood flow within the vessel (here, toward the heart). In other embodiments, the user 240 may orient the AVAD 200 in another manner. As seen in FIG. 2E, the user can use one or more fingers, such as their index and/or middle fingers 240IF, 240MF on their left hand 240L to actuate the joy button 216(1) and push button 216(2) (FIG. 2D), and their left-hand thumb 240T can engage with either of the recesses 228R (FIG. 2B). If the user holds the AVAD 200 with their right hand, the user may operate the joy button 216(1) and push button 216(2) (FIG. 2D) with their right-hand thumb and engage the right-hand index and middle fingers with the recesses 228R.

FIGS. 3A through 3D illustrate example images that the AVAD 200 of FIGS. 2A through 2D can display on the graphical display 220, for example, while the user is using the AVAD to perform the procedure illustrated in FIG. 2D. As discussed below, the images of FIGS. 3A through 3D are a time-series of US images from the US device 204 of the AVAD 200 (FIG. 2C) enhanced with information from vessel-tracking algorithms, with the information here being an asterisk 300 identifying the center of a target blood vessel 304, as highlighted by arrows. FIG. 4 illustrates another example image that the AVAD 200 of FIGS. 2A through 2D can display on the graphical display 220 while the user is using the AVAD 200 to perform the procedure illustrated in FIG. 2D. The image of FIG. 4 is a US image from the US device 204 enhanced with information from a vessel identification algorithm, here estimated locations 400 and 404 of the walls of a pair of blood vessels 408 and 412.

Figure 5:
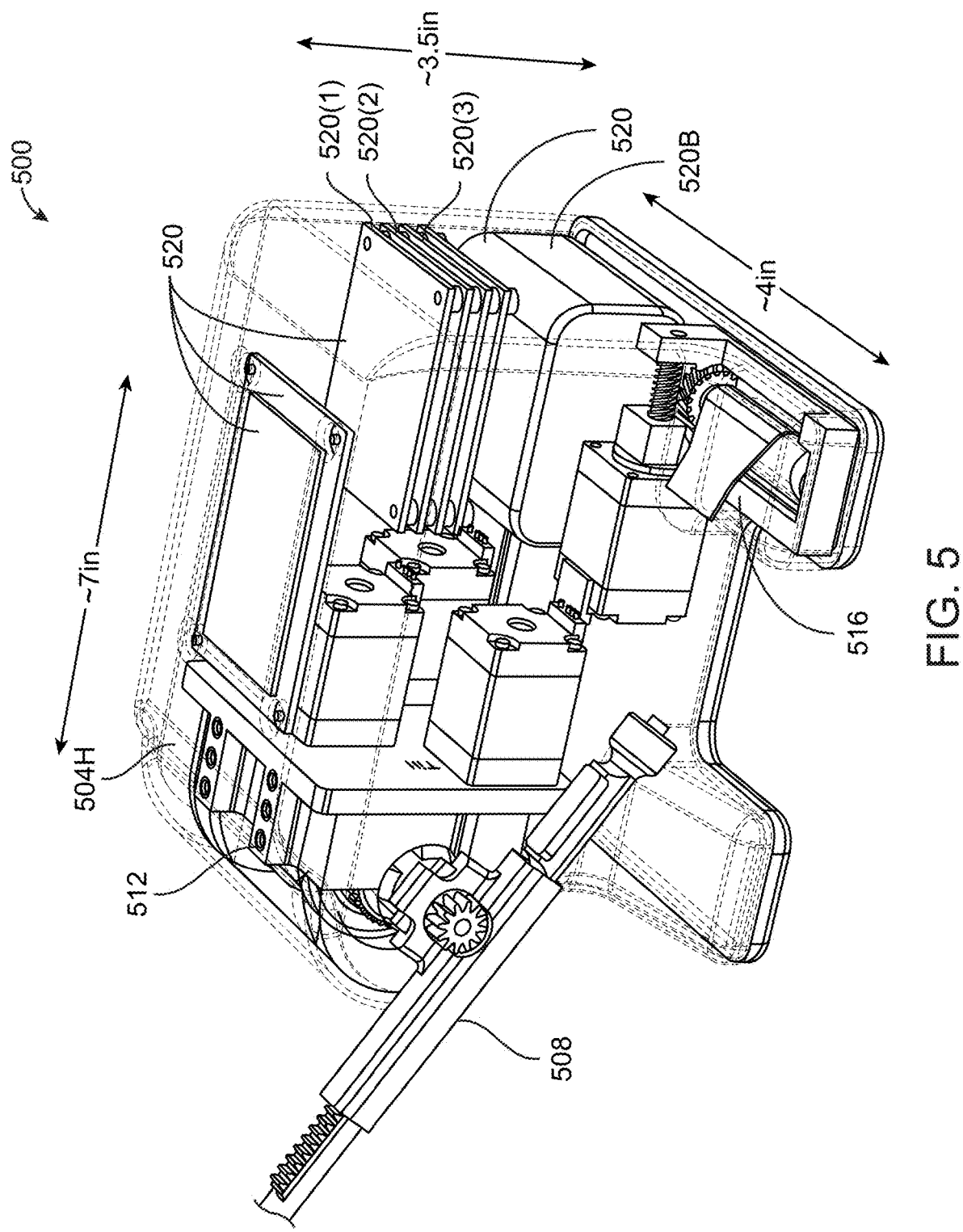
FIG. 5 is an isometric view of another example AVAD of the present disclosure.

FIG. 5 illustrates a second example of an AVAD 500 of the present disclosure. In this example, the AVAD 500 includes four major systems contained in a sealed handheld housing 504H, which is illustrated in FIG. 5 (top portion of housing shown translucent for clarity). These systems are as follows: (1) a disposable needle cannulation assembly 508; (2) a needle-manipulation system 512; (3) a US sensor system 516; and (4) a power, control, and display system 520. In this embodiment, these systems 508 through 520 are all contained within a small battery-operated portable AVAD 500 that in one nonlimiting instantiation measures approximately 7"×3.5"×4".

Figure 6A:
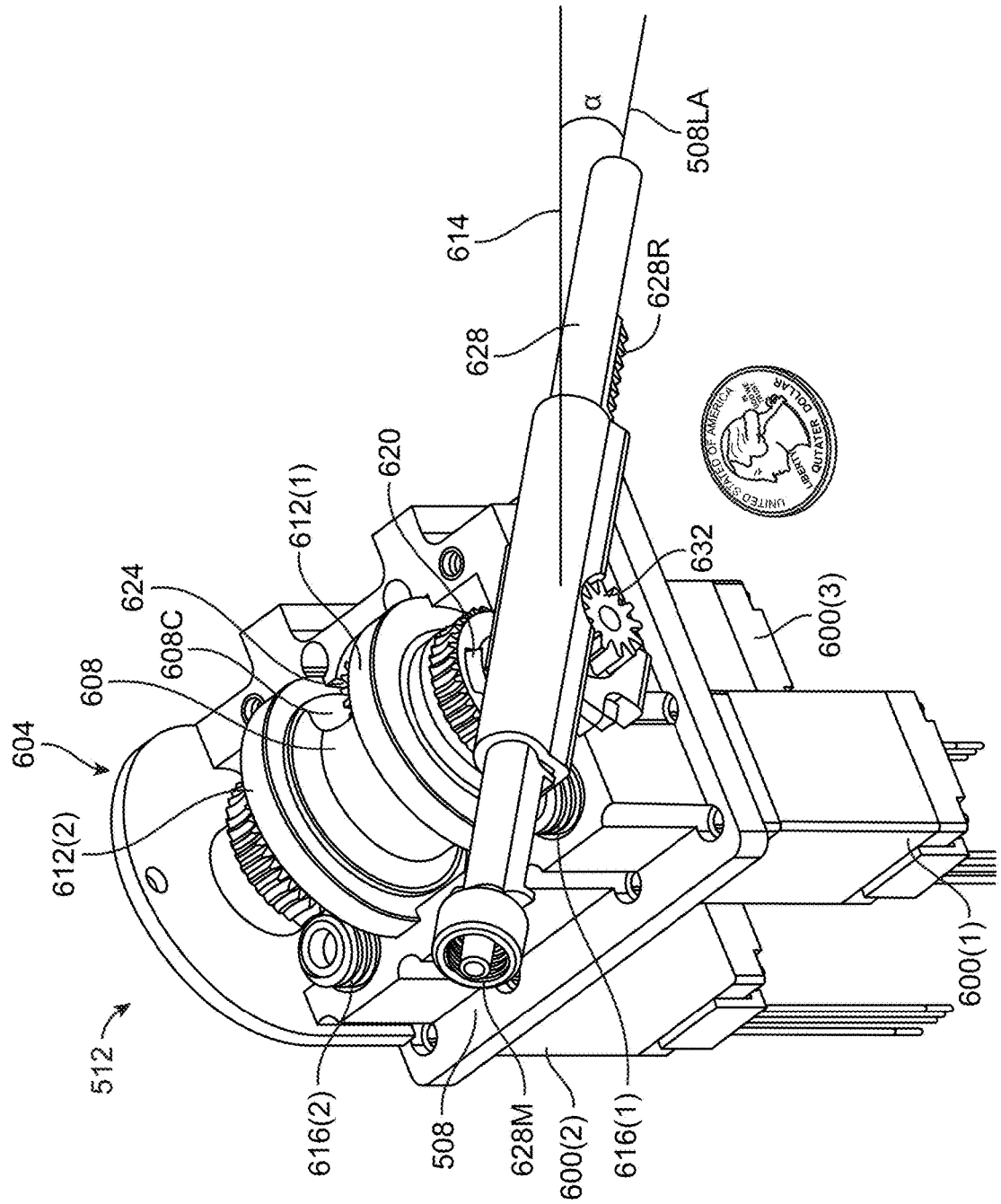
FIG. 6A is an enlarged isometric view of the needle-manipulation system of the AVAD of FIG. 5.

Needle-Manipulation System. Referring to FIG. 6A, the needle-manipulation system 512 of the AVAD 500 of FIG. 5 is the most mechanically complex system of the AVAD and comprises three stepper motors 600(1) through 600(3) (with encoders) that drive a gearbox 604 that moves the needle cannulation assembly 508 in three directions. The example needle-manipulation system 512 includes an outer barrel 608, supported by a pair of bearings 612(1) and 612(2), that provides rotary motion and changes the angle, α, of the longitudinal axis 508LA of the needle cannulation assembly 508, in a single plane, relative to a fixed coordinate system local to the AVAD 500, arbitrarily represented in FIG. 6A by in-plane axis 614. The bearings 612(1) and 612(2) hold the outer barrel 608 firmly to the housing 504H (FIG. 5) and at a known position relative to the US sensor system 516. This relationship is critical because it defines where the needle (not shown) of the needle cannulation assembly 508 is positioned relative to the plane that the US sensor system 516 (FIG. 5) is imaging. The outer barrel 608 is driven via worm gears (only worm gears 616(1) and 616(2) visible) by corresponding ones of the three stepper motors 600(1) through 600(3). The center of the outer barrel 608 includes a splined cylindrical opening (not seen) to accommodate axial movement of a center drive shaft 620. The spline keeps the drive shaft 620 radially positioned and only allows lateral motion of the needle (i.e., in a direction perpendicular to a plane containing the longitudinal axis 508LA of the needle cannulation assembly 508). The drive shaft 620 is motor-driven by a rack-and-pinion gear set 624 through a cutout 608C in the outer barrel 608. In this example, the drive shaft 620 is hollow to accommodate an inner shaft (not seen), which attaches to the needle cannulation assembly 508 (square drive on the distal end) and a small pinion gear on the proximal end. The inner shaft is rotated using the worm gear 616(1) and the corresponding stepper motor 600(1). This power-train arrangement allows the inner shaft (and thus the pinion) to be driven regardless of the orientation of the outer barrel 608 and the extension position of the drive shaft 620.

Disposable Needle Cannulation Assembly. Referring still to FIG. 6A, the needle cannulation assembly 508 may comprise a square mating piece (not seen) that attaches to the needle-manipulation system 512 and guides a needle plunger rod 628. A drive pinion 632 on the needle-manipulation system 512 interfaces with a gear rack 628R on the needle plunger rod 628. In some embodiments, the plunger rod 628 can hold a J-wire (not shown) in a plastic pouch for a Seldinger-type access technique or a needle and a catheter, etc. In the embodiment shown, the needle plunger rod 628 includes a mounting surface 628M for a small vibrating element (not shown), which is operable to quickly vibrate the needle in its axial direction, for example, to facilitate vascular access in hypotensive patients with collapsed veins. The electrical connection to the vibrating element can be accomplished, for example, by integrated conductors through the square mating connector (not shown) of the needle-manipulation system 512.

Figure 6B:
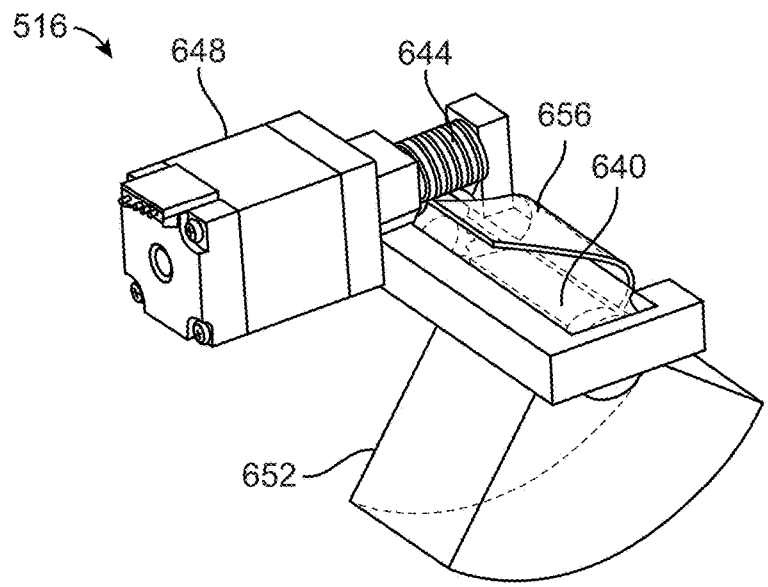
FIG. 6B is an enlarged isometric view of components of the scanning-type ultrasound system of the AVAD of FIG. 5.

Ultrasound Sensor System. Referring to FIG. 6B, the US sensor system 516 of this example includes a pivotable US array 640 that is pivoted, here, by a worm-gear set 644. In this example, the worm-gear set 644 is driven with a stepper motor 648, which may, if desired, be identical to the stepper motors 600(1) through 600(3) of the needle-manipulation system 512 of FIGS. 5 and 6A. The pivotable US array 640 may also include an encoder (not shown) to precisely determine the angle of the US array, relative to the needle tip (not shown), needed to coordinate the imaging envelope 652 and the guiding of the needle tip to the correct location. This approach can allow continuous visualization of the needle tip and the target vessel that can be used as a feedback control loop to guide the needle tip to the target vessel. In this example, the US array 640 is in electrical communications with the power, control, and display system 520 via a signal cable 656.

Power, Control, and Display System. Referring back to FIG. 5, the power, control, and display system 520 may comprise the following elements: (1) ultrasonic array drive electronics 520(1); (2) stepper motor drive electronics 520(2); and (3) a microprocessor 520(3) that generates images from the US sensor system 516 and calculates a desired needle trajectory, as well as provides a user interface. Within the power, control, and display system 520 is a touchscreen display 520D and any tactile control(s) (not shown) that allow a user (not shown) to interface with the AVAD 500. In this embodiment, a battery 520B and power conditioning and charging circuit (not shown) provide the energy needed to run the entire AVAD 500.

Figure 7A:
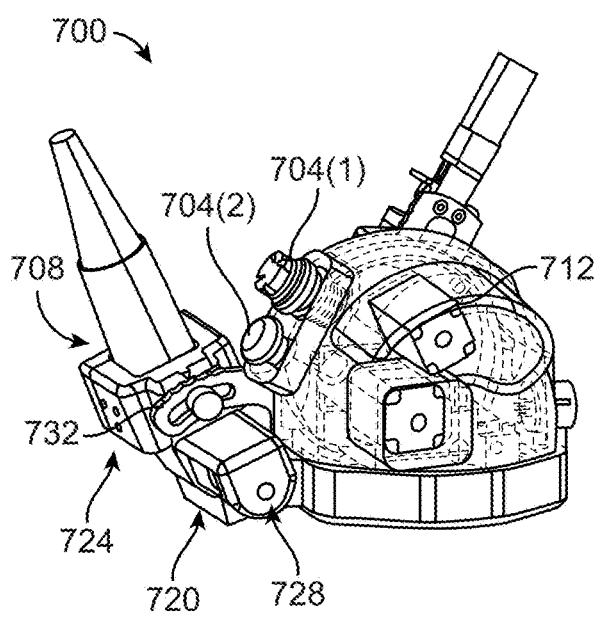
FIG. 7A is an isometric view of a further AVAD of the present disclosure, highlighting physical UI controls and internal components, among other features.
Figure 7B:
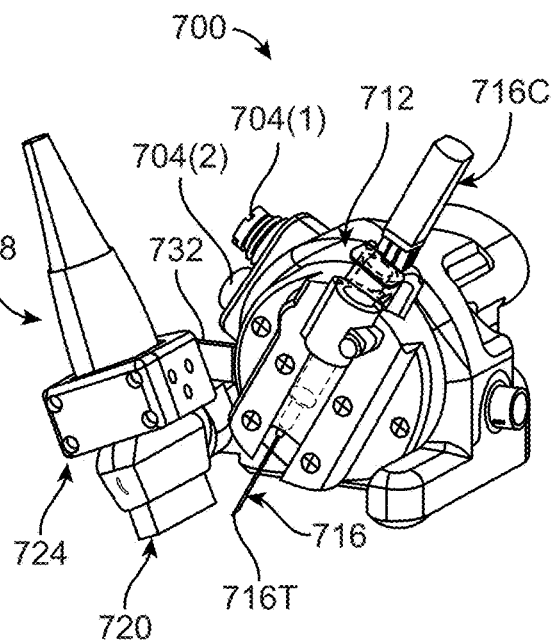
FIG. 7B is an isometric view of the AVAD of FIG. 7A, highlighting the needle-manipulation mechanism and other features.

FIGS. 7A and 7B show another example AVAD 700 that generally includes the same systems listed above in connection with the AVAD 500 of FIG. 5. However, the AVAD 700 of FIGS. 7A and 7B is embodied in a different mechanical configuration having more-ergonomic holding surfaces, relative to the AVAD 500 of FIG. 5, to further improve stability of the AVAD 700 when engaged with a patient and to provide easy two-handed operation. Like the example AVAD 200 of FIGS. 2A through 2D, the AVAD 700 of FIGS. 7A and 7B includes two buttons 704(1) and 704(2) for direct user input. In this example, these buttons 704(1) and 704(2) include a 4-way joystick button 704(1) that allows a user to move a target cursor on a remote electronic graphical display (not shown, but see, for example, FIG. 13 and accompanying description) in real time. The second of the buttons 704(1) and 704(2) is a pushbutton 704(2) that, in this example, allows the user to confirm a new target selection. This example button-based interface, combined with a remote graphical display, allows the user to precisely and stably hold the AVAD 700 and guide it to the needed location with one or both hands, utilizing multiple gripping areas, while receiving real-time feedback from the onboard US sensor system 708 and the remote graphical display.

The AVAD 700 of FIGS. 7A and 7B includes a needle-manipulation system 712 that includes mechanical components that maintain the position of the needle 716 when power is removed from the needle-manipulation system, thereby allowing the AVAD 700 to conserve power when needle motion is not required. This contributes to minimizing mass of the AVAD 700 and improves its precision and hand-hold ability.

FIGS. 8A through 8C show details of the needle-manipulation system 712 of the AVAD 700 of FIGS. 7A and 7B. In this example, the needle-manipulation system 712 uses three stepper motors, namely, a lateral actuation motor 800(1), an angle motor 800(2), and a needle-advancement motor 800(3), to provide the needle 716 (FIG. 7B) with 3-axis motion control. This embodiment of the needle-manipulation system 712 includes a rail-mounted translation sled 804 and the lateral actuation motor 800(1) that sets the lateral position of the needle 716 (FIG. 7B). The needle-manipulation system 712 further holds an additional two axes of needle-motion actuators. A needle attachment disk 808, whose angle can be varied using the angle motor 800(2), is attached to the sled 804 via a curved rack and pinion gear arrangement 812. This arrangement provides a second degree of freedom for the needle 716 (FIG. 7B). The needle-advancement motor 800(3) drives the needle cartridge 716C (FIG. 7B) through a needle drive pinion gear 816 and drives the needle 716 axially to the desired position. In this embodiment, the needle cartridge 716C (FIG. 7B) is attached to the AVAD 700 via a dovetail mount 820, which minimizes play and backlash in the needle-manipulation system 712.

The AVAD 700 includes positive stops to constrain the maximum travel in each of the above 3-axis directions to assist in calibrating the needle tip 716T (FIG. 7B), for example, as discussed below. This allows the AVAD 700 to maintain a consistent home position to provide the ability to maintain device repeatability. This is done by returning the needle tip 716T to a home position and resetting the spatial coordinates of the AVAD 700 to default values. This homing feature is used independently of the non-contact needle calibration methodologies described below and provides another modality of operation of the AVAD 700 if the dimensions of the needle cartridge 716C are precisely known via cartridge manufacturing precision. Thus, the AVAD 700 can operate successfully with or without the needle calibration.

Needle Penetration

As just discussed, in the embodiment of FIGS. 7A, 7B, and 8A through 8C the needle-manipulation system 712 includes a mechanical component that can move the needle cartridge 716C in three axes and can position the needle 716 within a selectable window in the US image displayed on the GUI (addressed above). In addition to the simple needle motions discussed above, as seen in FIG. 9A the AVAD 700 also contains a needle-jab system 900 to jab, or poke, the needle 716 (FIG. 7B) into the targeted anatomical structure (e.g., blood vessel) (not shown). As mentioned above, one option, i.e., a needle-oscillation system, induces a relatively high-frequency vibration in the needle tip 716T, for example, to assist piercing a vessel wall. In addition to the high-frequency vibration option, the present embodiment of the AVAD 700 contains the axial needle-poke option embodied in the needle-jab system 900, wherein the needle 716 is relatively slowly drawn back a small amount and then lunged relatively quickly forward generally that same amount to provide the jabbing action that can, for example, pierce a vessel wall with minimal displacement of the vessel wall. Once the initial piercing jab has been effected, the AVAD 700 may advance the needle into the vessel as needed using the needle-manipulation system 712. Once vascular access is established, a desired intravenous (IV) technique can be performed, such as manual insertion of a Seldinger wire. In some embodiments, the needle-jab motion can be performed repeatedly to effectively provide an alternative continuous movement option to the vibration option, which may be implemented in a lower frequency regime than the higher frequency option mentioned above. Each of these options is described below.

A needle vibration capability can additionally or alternatively act as the AVAD 700 advances the needle 716 to the vessel to reduce cutting forces and to penetrate the vessel wall. In one example, the AVAD 700 incorporates three methods for moving the needle 716 with a rapid velocity change, either in vibration and/or single or repeated jabbing motion(s). In this example, the first method is a simple vibratory eccentric weight (not shown), with the needle cartridge 716C designed to be rigid in any radial direction and compliant along the axial needle axis. This causes the needle tip 716T to only oscillate in the axial direction only, for example, in a range of 10 Hz to 1 kHz, among others. In one particular instantiation, a frequency of 330 Hz was used. The second and third methods each involve a lower-speed needle-jab system 900 that provides advantages of needle vibration without the uncertainty and needle position destabilization of conventional vibratory systems.

In this example and referring again to FIG. 9A, this needle-jab system 900 includes a small gearmotor 904 that rotates a sawtooth disk 908 (FIGS. 9A and 9B) against a fixed complimentary sawtooth anvil 912 at the bottom of an opening within a component 916 that receives the sawtooth disk and holds the needle cartridge 716C (FIG. 7B). The sawtooth disk 908 draws the needle backwards against a spring 920 as sawtooth ramps 908R of the sawtooth disk and sawtooth ramps 912R (only 2 of 4 labeled) of the sawtooth anvil 912 engage one another. As the sawtooth disk 908 completes its rotation cycle, its ramps 908R fall off the edge of the sawtooth ramps 912R, and the needle 716 (FIG. 7B) snaps, or lunges, forward in a jabbing motion using the energy of the compressed spring 920.

In some embodiments, the needle-jab system 900 provides, for example, a constant 0.25 mm to 0.5 mm relatively slow drawback, then a rapid forward motion. When operated in a single short burst, this second method acts as a jab to get the needle 716 (FIG. 7B) into the vessel. In some embodiments, the needle-jab system 900 generally mimics the manual motion typically utilized by some medical practitioners during manual US-guided cannulations. As those skilled in the art will appreciate, in this example the anvil 912 has the same number of ramps 912R as the sawtooth disk 908, and the ramps 908R and 912R on both the sawtooth disk 908 and the sawtooth anvil are shaped so that as the rotary motion of the sawtooth disk causes the two trailing edges of each set of opposing ramps to first perfectly align and then pass one another, the ramps momentarily disengage one another, allowing the biasing spring to lunge the sawtooth anvil, and therefore the needle 716 (FIG. 7B), forward until the sawtooth anvil contacts the sawtooth disk. In alternative embodiments, ramps may be provided on only one or the other of the sawtooth anvil 912 and the sawtooth disk 908, with another type of structure, such as a radial embossment, used on the other one of the anvil and disk. In such alternatives, the number of other structures may match the number of ramps or be some fraction of the number of ramps. For example, if four ramps are provided, one, two, three, or four embossments may be provided. Generally, the minimum number for each of the ramps and embossments for such an arrangement may be two.

Those skilled in the art will readily appreciate that the needle-jab system 900 shown and its variants discussed above are not the only ways to provide a jabbing action having a relatively slower drawback (e.g., 250 milliseconds) and a relatively faster forward lunge. For example, a sawtooth disk can be provided in an orientation 90° different from the orientation shown in FIG. 9A and have one or more ramps on its circumferential surface, e.g., in the manner of a circular-saw blade. The anvil part in such an embodiment may comprise a single structure (e.g., embossment) or multiple structures (e.g., embossments) biased into engagement with the circumferential surface of the sawtooth disk in the manner of a cam and follower arrangement. Other embodiments may include, for example, one or more linear actuators that imparts the necessary withdrawal and lunging motions. Those skilled in the arts will readily understand how to devise a variety of mechanisms that can be used to provide the desired jabbing action. It is noted that although the biasing means shown in FIG. 9A is a helical spring 920, any suitable biasing means, such as one or more Bellville washers, one or more elastomeric elements, one or more cantilever springs, etc., and any suitable combination thereof, can be used.

In the embodiment of the needle-jab system 900 illustrated in FIGS. 9A and 9B, and in the circumferential-ramp alternative described above, the speed of the drawback movement can be controlled by the rotational speed of the shaft that drives the corresponding sawtooth disk 908. This rotational speed can be controlled, for example, by varying the speed of the gearmotor 904 that ultimately drives the sawtooth disk and/or using a geared or continuously variable transmission.

The jabbing motion may be executed as a single operation, i.e., with a single withdrawal and a single forward lunge, or it may be executed repeatedly for an amount of time. In some embodiments, the frequency of the drawback and lunging movements may be in a range of 5 Hz to 60 Hz or 1 Hz to 10 Hz, among others. When the second method is operated continuously, it functions as a third method that effectively provides an axial needle motion as a low frequency vibration.

In some embodiments, vibratory oscillation may be used in conjunction with jabbing. For example, vibratory oscillation may be used up to a point at which the needle tip reaches a vessel wall. Then, the vibratory oscillation may be stopped and poking initiated, either as a one-time movement (withdrawal and lunging) or as a series of repeated such movements.

Referring back to FIGS. 7A and 7B, the US sensor system 708 includes a US transducer 720 that is movably mounted to the AVAD 700 via a transducer holder 724. The transducer holder 724 is pivotable about a pivoting joint 728 and angularly adjustable via an angle-adjustment mechanism 732. In this embodiment, that US transducer 720 is a conventional handheld US transducer.

Example AVAD Design Refinements

Other features may be provided to an AVAD of the present disclosure to refine and/or improve the device in several areas. These include enhanced design features to further improve accuracy and consistency of needle tracking and vessel penetration, meet the needs of rapid and repeated sterilization, and provide a simpler and more intuitive user interface. Implementing these design improvements can also reduce the weight and size of the AVAD.

AVAD sterility design features. AVAD design may include the selection of disinfectant-compatible materials to achieve any necessary cleaning and sterility measures/requirements for acceptable medical use. Special consideration can be given to rapid cleaning and disinfecting of the device between patients, which are important for a commercially viable device.

An APMAD of the present disclosure may be designed with a particular cleaning/disinfecting/sterilizing plan for each component of the APMAD. For example, FIG. 10 illustrates an example AVAD 1000 that includes a core mechanism 1004 that includes the electronics (not shown) and motion control hardware (not shown). In this example, the core mechanism 1004 can tolerate low-level disinfection (LLD), such as wiping down exposed surfaces with a disinfectant cloth. Sealing features (not shown), such as O-rings and rubber seals, can be included to prevent fluid from entering into internal spaces within the core mechanism 1004 during LLD. In the embodiment shown, a US transducer 1008 can be easily detached from the core mechanism 1004 and cleaned with high-level disinfection (HLD) procedures—such as submersion in a disinfectant bath or disinfection with a TROPHON® machine, available from GE Healthcare, Chicago, Illinois. Likewise, a baseplate 1012 and a needle motion disk 1016 can be designed to be detached from the core mechanism 1004 and be cleaned according to HLD procedures (or replaced with new elements). In addition, a needle assembly 1020 may be an off-the-shelf catheter that is supplied sterilized and packaged for one-time use.

Reduced AVAD weight and improved precision. As noted above, the needle-manipulation system 712 of FIGS. 7B and 8A through 8C utilizes three stepper motors 800(1) through 800(3) to generate 3-axis needle movements. While ideal for rapid and iterative early prototyping, these motors 800(1) through 800(3) and corresponding controllers (not shown) draw more electrical energy and are bulkier than desired for an integrated, handheld device. The stepper motors 800(1) through 800(3) may be replaced, for example, with piezoelectric motors, such as those used in camera aperture and focus mechanisms, because they are very precise and compact, can be controlled with an embedded microprocessor, and consume relatively very small amounts of electrical power. These design changes may 1) improve overall needle actuator precision (±0.25 mm accuracy), 2) reduce size and weight of the needle actuator (15% reduction), and 3) consume less electrical power.

Example alternatives for the needle oscillator and inclusion of force measurement. The proof-of-concept needle oscillation mechanism produces back-and-forth axial needle motions as it approaches the vessel wall. This novel feature prevents vessel tenting and rolling. However, the mechanism currently uses a bulky gear motor and is externally mounted to the needle holder, which presents challenges for cleaning the device between uses. The needle oscillation mechanism may be implemented differently so that it is integrated with the needle actuator. This may involve, for example, a ratcheting, spring-loaded drive mechanism to produce the required oscillating frequencies and amplitudes needed to pierce the vessel wall. In doing so, the size of an AVAD of the present disclosure may be reduced further. In addition to a refined needle oscillator or poke mechanism, some embodiments of an AVAD of this disclosure may incorporate a needle force sensing provision. This may be implemented, for example, in a two-pronged approach with a direct force sensor on the needle cartridge and/or advancement mechanism and also a measurement of the drive power required to advance the needle.

Non-Contact Needle-Tip Calibration

Figure 11:
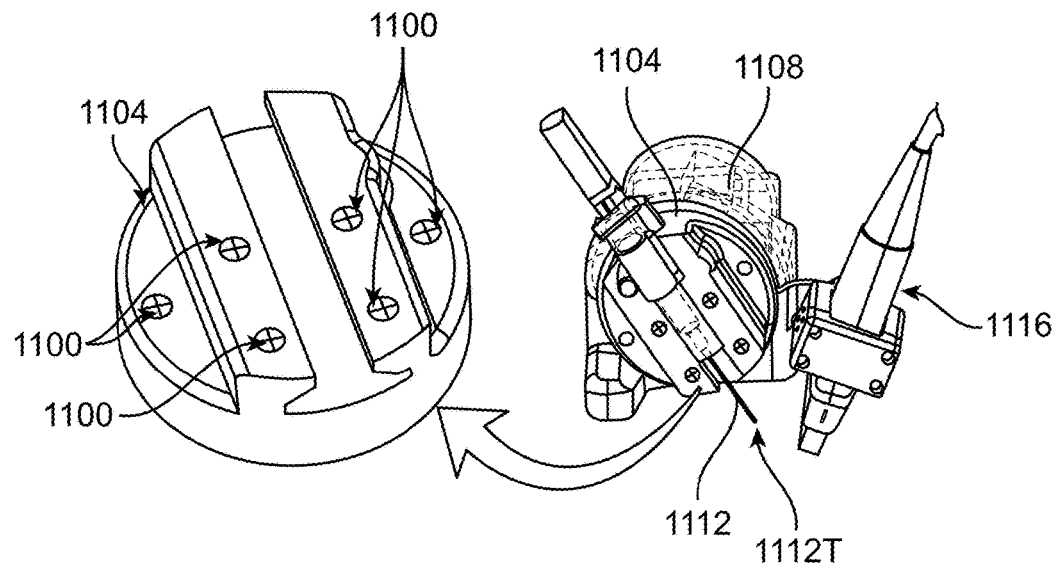
FIG. 11 contains a perspective view of an example AVAD and an enlarged perspective view of the disk portion of the needle-manipulation system of the AVAD.

In some embodiments, non-contact needle-tip calibration can be used to locate the needle tip relative to the US probe to overcome manufacturing variability observed with catheter needles while maintaining needle sterility. In one example, a stereo-imaging calibration arrangement can be implemented to accurately measure the needle tip position relative to one or more fiducials on an AVAD itself. The example non-contact calibration arrangement uses at least two compact machine-vision cameras to image the needle tip and one or more portions of the AVAD from two differing perspectives. In some embodiments, the needle-tip calibration method uses triangulation, based on optical imagery, to determine the three-dimensional location of the needle tip with respect to the AVAD. Since the trajectory of needle actuation is known with respect to the AVAD, measuring the position of the needle tip is sufficient to determine the insertion trajectory. One or more precisely positioned optical targets (fiducials) on one or more outer surfaces of the AVAD are included, allowing measurement of the device position. As an example, FIG. 11 shows multiple optical targets 1100 (here, crosses) on a disk portion 1104 of a needle-manipulation system 1108 that is similar to the needle-manipulation system 712 of FIG. 7B. The needle tip 1112T is inherently a precise feature that can be identified in the imagery, and so can be localized in 3D space. An example system measures needle tip position to a displacement of approximately 76 µm (RMS) at the working depth of the stereo system.

Figures 12A, 12B:
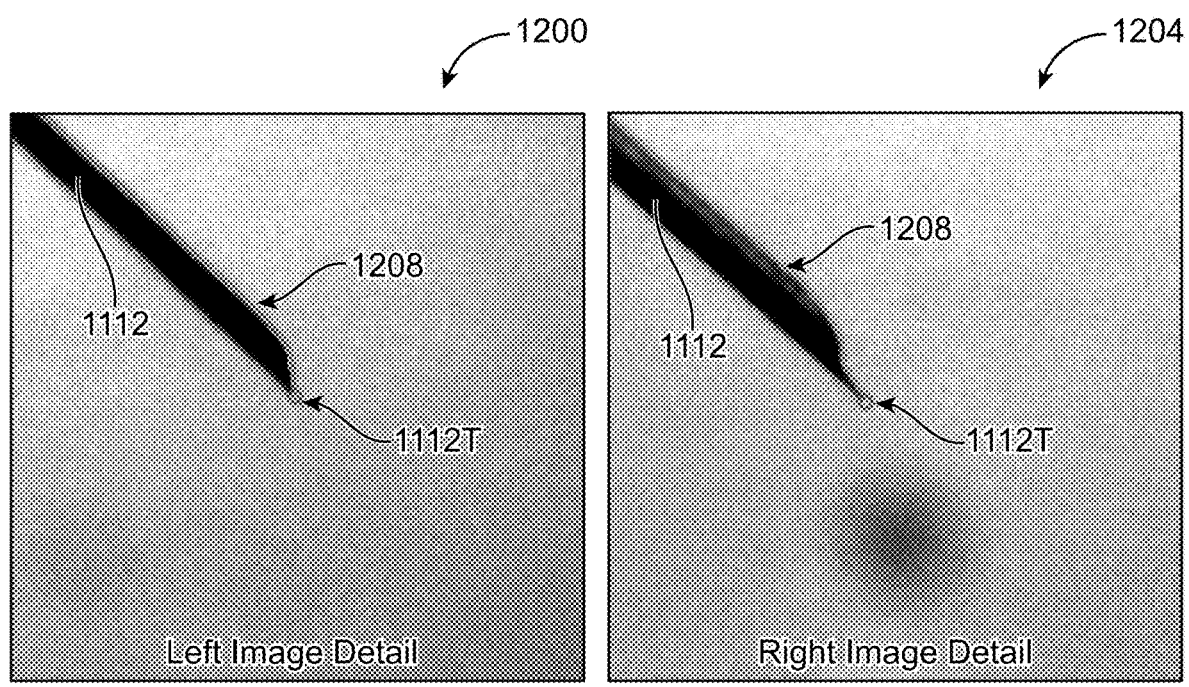
FIG. 12A is an image of a portion of a needle as taken from a first vantage point, wherein the image has been augmented to display a boundary around the needle.
FIG. 12B is an image of the portion of the needle of FIG. 12A, as taken from a second vantage point different from the first vantage point, wherein the image has been augmented to display a boundary around the needle.

FIGS. 12A and 12B show an example result of executing a needle-tip calibration algorithm. The image 1200 of FIG. 12A is of a portion of the needle 1112 of FIG. 11 as taken from a first camera located at a first vantage point, and the image 1204 of FIG. 12B is of the same portion of the needle of FIG. 11 as taken from a second camera located at a second vantage point different from the first vantage point. Each of the images 1200 and 1204 show a portion of the needle 1112, including the needle tip 1112T, along with a boundary 1208 that the needle-tip calibration algorithm has generated. In each of the images 1200 and 1204 the needle 1112 is accurately segmented, and the needle tip 1112T is precisely located. The software then transforms this information into a device coordinate system in order to get the needle calibration relative to the US transducer 1116 (FIG. 11) and corresponding image data. In this example, the needle tip 1112T was estimated to be 2.315 inch from the rotational center of the disk portion 1104 (FIG. 11), 0.041 inch below the nominal axis of needle actuation, and 0.026 inch further from the device than nominal axis of actuation. The two latter dimensions illustrate a deviation in the location of the needle tip 1112T as compared to the needle being perfectly straight and perfectly mounted. All these values are consistent with needle-mounting uncertainties and represent the corrections that must be made for needle-mounting variances in this example.

In some embodiments, components of the needle tip calibration system, such as the cameras and/or illumination system, may be integrated into an AVAD. For example, miniature camera and lens assemblies may be fixedly secured to the AVAD and be calibrated during manufacturing so that the precise locations of the image sensors are known relative to a suitable coordinate system. If an onboard illumination system is provided, such as an illumination system providing one or more collimated light beams, the location(s) and directionality(ies) of the light source(s) and beam(s) can also be precisely determined at the time of manufacture, as needed to suit the particular design considerations of the calibration system.

The example calibration technique discussed above has been demonstrated to work reliably and to provide needle tip position accuracy exceeding the resolution of the US imaging system. However, other needle-tip calibration techniques are also possible. These include:

Needle Shadowing: External needle shadowing relies on an AVAD being repeatably placed at a known location (such as, for example, a charging tray, base station, carrying case, or the like). In an embodiment, a pair of offboard (relative to the AVAD) collimated light sources are projected across the needle and the shadows of the needle are then recorded on one or more sensors, such as one or more linear sensors. In some embodiments, the sensor(s) may be integrated into the AVAD. In some embodiments, the sensor(s) may be located externally to the AVAD. The needle moves axially, and the tip location is determined on the sensor(s) as it breaks the collimated beam. In some embodiments, the collimated light sources may be integrated into the AVAD, along with the sensor(s).

Magnetic Induction: A small ring containing several coils is placed around the needle. The offset of the needle from the ring centerline is measured by the AC response of the coils as they are excited. The ring uses transmission and receive coils which can change duty as needed. The ring is part of a baseplate that the AVAD is placed on (which also will charge the device) and the needle is advanced into the ring and data collected on the absolute deviation from perfect axial alignment. This deviation is then applied as a correction to the needle trajectory algorithm.

In some embodiments, needle-tip position (e.g., coordinates) are used for precision needle manipulation and/or guidance. While other embodiments of an AVAD of the present disclosure may use other methods for needle manipulation and/or guidance, such as real-time imaging/sensing-based feedback control, those other methods can be challenging and/or expensive to implement in real-world applications. For example, feedback control based on real-time imaging/sensing often requires fairly complex schemes for imaging/sensing the needle tip and typically needs to handle noisy imaging/sensing signals. Real-time feedback does indeed provide the ability to compensate/adjust the needle trajectory as it travels towards a vessel (or other body cavity), but it comes at the expense of computational effort and the need to visualize/determine the needle tip in relation to the targeted vessel in real time. For example, this can mean that the US array would need to be physically manipulated to view the needle tip and then the vessel, back and forth as the needle tip approaches the vessel. These requirements and/or noisy signals lead to significant device complexities and computational requirements. In contrast, a needle-tip position calibration approach as disclosed herein can be rapid (e.g., ~5 s-10 s) to perform and does not require manipulation of the US array or impose additional computational requirements on the device as the needle tip is advanced to the vessel.

Another alternative method avoids the challenges with real-time image/sensor-based feedback control. However, this method uses a position of a location on a needle or needle carriage that is distal from the tip of the needle. This method assumes, among other things, that each needle used is precisely manufactured such that its needle tip is precisely located where it is supposed to be. Unfortunately, manufacturing tolerances are not necessarily as tight as needed, especially for longer needles. Needles can also be damaged during shipping and handling, among other activities. As those skilled in the art will readily appreciate, determining the needle-tip location for each needle mounted to an AVAD for use and using that location in the needle actuation and/or guidance for that needle as disclosed herein avoids problems that arise from both real-time imaging/sensing feedback control and control schemes in which assumed needle-tip positions do not account for imprecisely manufactured needles and/or damaged needles.

In some embodiments, an APMAD/APMAD system of the present disclosure may perform a method of calibrating a handheld device (e.g., an APMAD, such as an AVAD) for accessing a target anatomical structure of a human or animal with a needle, with the needle being securely fastened to the handheld device. The method may include receiving a user input initiating a needle-tip location calibration process that is configured to determine the position of the tip of the needle relative to the handheld device. As noted above, in embodiments of an APMAD that base needle actuation and/or guidance on an initial needle-tip position, this calibration process can be an essential step for achieving accurate and precise cavity access.

The user input may be any suitable input, such as an input generated in response to a user actuation of a control (e.g., hard or soft control, such as a hard or soft button), a voice command, or user placement of the handheld device in a cradle, among other things. Depending on the configuration of the APMAD/APMAD system, the user input may be received by the handheld device itself or some other component of the APMAD system, such as a charging station, a cradle, a tablet computing device, a laptop computing device, or other component.

In response to receiving the user input, the APMAD system causes at least one sensor to acquire position data for the needle tip. As discussed above, in some embodiments a pair of image sensors (e.g., embodied in camera+lens assemblies) may be used to acquire the position data as image data, whereas in other embodiments, another type of sensor can be used. As also discussed above, the position-data-acquisition sensor(s) can be located either offboard or onboard the handheld device, or both, depending on the configuration of the calibration system implemented. As discussed above, some embodiments may use one or more fiducial markers onboard the handheld device for providing local references that can be used to determine needle-tip position relative to the handheld device, whereas some embodiments may not require use of such fiducial markers. The at least one sensor may be controlled via a suitable needle-tip calibration algorithm—embodied in machine-executable instructions—executed by any one or more microprocessors that may be part of the APMAD system. For example, all computing may be performed aboard the handheld device itself, all computing may be performed offboard the handheld device, or the computing may be performed partially onboard and offboard the device.

After acquiring needle-tip position data, this data may be used to determine the position of the needle tip relative to the handheld device, for example, using suitable algorithms for processing the position data into coordinates of the needle tip relative to a suitable coordinate system local to the handheld device. Those skilled in the art will readily understand how to determine/calculate needle tip coordinates based on the nature of the position data, such as the position data comprising stereo images (e.g., from two cameras) or comprising silhouette images acquired by three sensors in three corresponding orthogonal planes, among others. Optionally, the needle-tip position data may be used to screen-out mis-installed and/or damaged needles as a safety screening function. For example, the APMAD/APMAD system may be programmed to know an expected-location window in which the needle tip should be positioned relative to the handheld device within certain tolerances. If the needle-tip position data reveals that the needle-tip position of a particular needle is outside of that expected-location window, then the APMAD/APMAD system can be programmed to reject that needle, for example, by providing a notification to the user and/or disabling needle-movement functionality of the handheld device until the user replaces the defective needle and the handheld device performs a successful calibration. Any notification provided may be of any one or more of any suitable form(s), such as illuminating a warning light (e.g., LED), displaying a warning on a graphical display, sounding an audible warning, and/or vibrating the handheld device, among others.

After determining the needle-tip position from the needle-tip position data, the APMAD/APMAD system may store the position (e.g., coordinates) in one or more suitable memories for use in the needle actuation and/or guidance algorithms. Each memory may be located onboard or offboard the handheld device and may be a volatile (e.g., RAM, cache, etc.) memory or a non-volatile memory (e.g., a solid-state or other hard drive memory, ROM, etc.), all depending on how the APMAD/APMAD system is configured. The needle actuation and/or guidance algorithms—embodied in machine-executable instructions—may be stored in the same or different memory(ies). In some embodiments, the needle actuation and/or guidance algorithms may use the stored needle-tip position in any suitable manner, such as to determine a correction factor to compensate for a difference from an expected position or as an initial position to which future trajectories may be related, among others. Those skilled in the art will readily understand how the needle actuation and/or guidance algorithms will use the needle-tip position based on the configuration of the algorithms.

Example integrated non-contact needle calibration. In some embodiments, a cradle that accepts the handheld AVAD may be deployed for automated non-contact calibration of the needle tip. This may be accomplished, for example, by mounting two miniature stereo cameras and miniature controlled lighting on the cradle to capture images of arbitrary needle tip positions. The image data may then be automatically processed in less than five seconds to calculate the needle tip position relative to the US probe and correct for needle manufacturing variability. This non-contact calibration method maintains needle sterilization and will be performed once a sterile catheter assembly is attached to the AVAD. In some embodiments, this cradle may also act as a home base, a charging station, and/or a docking station of a carrying case, among other things, for the AVAD.

Figure 13:
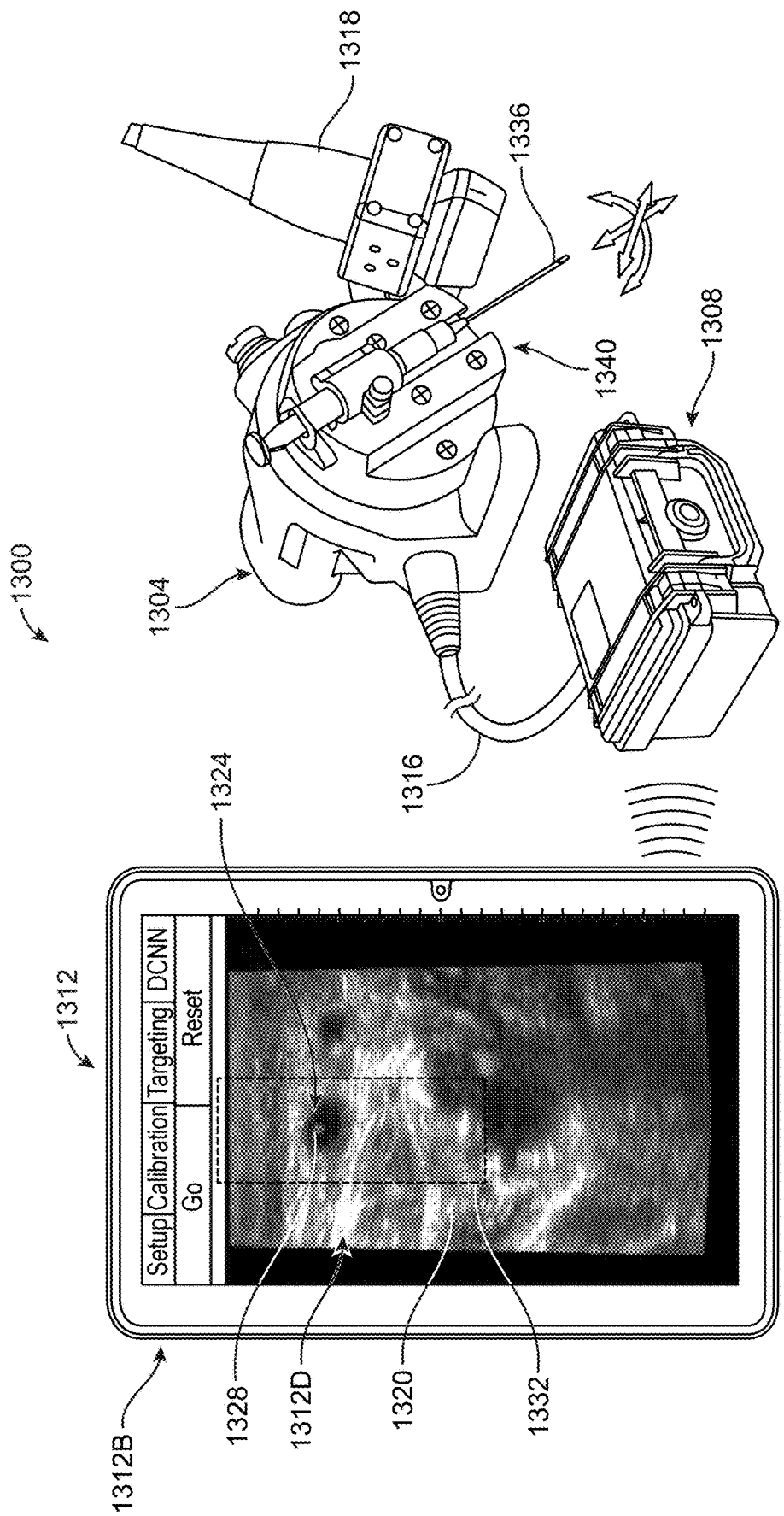
FIG. 13 is an isometric view of an example AVAD system that includes an AVAD wiredly tethered to an electronics control unit.

As noted above, an APMAD or AVAD of the present disclosure may be self-contained or be part of an APMAD system or AVAD system that includes one or more components external to the APMAD or AVAD. FIG. 13 illustrates an example AVAD system 1300 that includes an AVAD 1304, an electronics control unit 1308, and a GUI device 1312. In this example, the AVAD 1304 is configured in the same manner as the AVAD 700 of FIGS. 7A and 7B and is wiredly tethered to the electronics control unit 1308 via a tether 1316 that carries both power to the AVAD and data signals from and to the AVAD. The electronics control unit 1308 contains one or more batteries (not shown) for powering both the AVAD 1304 and electronic components aboard the electronics control unit, such as one or more microprocessors (not shown), memory(ies) (not shown), and one or more radios (not shown) for communicating with one or more other devices, here, the GUI device. The battery(ies) aboard the electronics control unit 1308 may be rechargeable in situ or externally to the electronics control unit.

The GUI device 1312 may be any suitable device having a graphical display 1312D, which may or may not be a touchscreen display, and allow for wireless communication with the electronics control unit 1308. The GUI device 1312 may be a device custom built for the AVAD system 1300 or a commercial off-the-shelf device, such as a tablet computer, that has been modified to include the necessary software for functioning in the AVAD system. The graphical display 1312D displays images captured by the US transducer 1318 of the AVAD 1304 and any visualization that the electronics control unit 1308 generates, such as an outline of a targeted blood vessel and/or one or more other visual indicators relating to the target blood vessel. If the graphical display 1312D is a touchscreen, it may also display information about the AVAD system 1300 and soft controls, such as the soft buttons 1312B (shown at the top of the touchscreen) and/or other user-input features to allow a user to control one or more aspects of the AVAD system. In the example shown, the graphical display 1312D is displaying a US image 1320 from the US transducer 1318 that is enhanced with information from a DCNN-targeted and tracked vessel 1324. Here, the enhancing information includes a marker 1328 indicating a calculated center of the tracked vessel 1324 and a focus box 1332 for focusing the viewer's attention to the region of the US image 1320 containing the tracked vessel 1324.

An example operation of the AVAD system 1300 can be summarized in the following four basic steps:

Step 1: A user selects artery or vein function, then places the AVAD 1300 onto a suitable site of a patient. Once the user has selected the operating mode and places the AVAD 1300 at a suitable site on the patient, the graphical display 1312D of the GUI device 1312 displays a real-time US image field. In an example, doppler ultrasonography discriminates between arteries and veins to identify candidate sites. Image-processing algorithms determine the target suitability, depth, center, and needle trajectory.

Step 2: Visual confirmation (fail safes). Built-in fail safes are designed to prevent unintended vascular access attempts and to provide a visual cue that the AVAD system 1300: (1) has properly identified a vein or artery (or other anatomical structure); (2) has properly detected the center of the vessel or other lumen or cavity; and (3) has not issued any warnings or active alarms.

Step 3: Activate device. Once the user confirmations are complete, the user activates the AVAD 1304, which then drives the needle 1336 to the center of the targeted artery or vein. The image processing algorithms generate the desired needle coordinates in the image plane. A device kinematic model onboard the electronics control unit 1308 converts those planar coordinates into a three-dimensional position relative to an AVAD frame of reference and outputs these coordinates to the needle-manipulation system 1340, which then moves the needle 1336 to this position. The user visually confirms needle penetration via US imaging shown on the graphical display 1312D of the GUI device 1312 and visually confirms blood flow through the distal end of the needle 1336.

Step 4: Insert guidewire into vessel. In some embodiments, this can be a manual step similar to US-guided cannulation, wherein the user visually confirms wire penetration in the vessel. Once confirmed, the AVAD system 1300 will retract the needle, followed by removal of the AVAD 1304 and insertion of a catheter.

Those skilled in the art will readily appreciate that the foregoing four basic steps can be generalized to a self-contained AVAD, such as the AVAD 200 illustrated in FIGS. 2A through 2D, as well as other AVAD systems.

FIGS. 14A and 14B show three example PTX-centric APMADs 1400, 1400', and 1400" representing three differing levels of feature integration. Each of these APMADs 1400, 1400', and 1400" is designed and configured to allow a user to acquire US images of internal structures within a patient and, if the acquired images show the appropriate indications, to initiate a penetrative procedure to decompress the lung cavity.

The APMAD 1400 on the left in FIG. 14A provides the two primary functions of acquiring US images and manipulating a needle 1404 to perform the penetrative procedure and needs to be tethered (wiredly and/or wirelessly) to an electronics control unit (not shown) and a graphical display (not shown), which may or may not be in the same external device as one another. The external electronics control unit performs all of the necessary processing of US images, including executing anatomical-structure-identification and tracking algorithms, as well as executing the needle-guidance algorithms and other algorithms for providing the necessary functionalities. The external graphical display displays the acquired US images and any image-enhancing information, such as anatomical structure boundaries and/or other visual markers and/or other data, such as anatomical-structure identifiers and targeting data, among other things.

The APMAD 1400' in the middle of FIG. 14A provides those same two primary functions while also providing the function of displaying the acquired US images along with any image-enhancing information, such as anatomical structure boundaries and/or other visual markers and/or other data, such as anatomical-structure identifiers and targeting data, among other things. The APMAD 1400' also performs all of the necessary processing of US images and the executing of anatomical-structure-identification and tracking algorithms and needle-guidance algorithms, among other things.

The APMAD 1400" on the right in FIG. 14A is also a completely self-contained unit that provides all of the functionalities of the two other APMADs 1400 and 1400' shown in FIG. 14A without needing to be tethered to any external devices. While not seen, in addition to the built-in graphical display 1408, the APMAD 1400" includes onboard hardware and software for performing all of the necessary image processing, needle-guidance processing, control-command processing, and other processing needed to make the APMAD fully functional and self-contained.

In these examples, each of the APMADs 1400, 1400', and 1400" has a basic vertical configuration that includes a body 1412, 1412', and 1412" having a gripping region 1412G, 1412G', and 1412G" designed for the user to grip the APMAD with a side grip (palm laterally adjacent to the body) with either hand. As seen in FIG. 14B, each gripping region 1412G, 1412G', and 1412G" contains a pair of tactile controls, here pushbuttons 1416(1), 1416(2), 1416(1)', 1416(2)', 1416(1)" and 1416(2)", respectively, that allow the user to control operation of the corresponding APMAD 1400, 1400', and 1400". It is noted that this vertical configuration of the APMADs 1400, 1400', and 1400" of FIGS. 14A and 14B is generally different in character from the generally squat configurations of the AVADs 100, 200, 500, 700, and 1304 described above. A reason for this is the nature of the PTX-decompression use of the APMADs 1400, 1400', and 1400", which can require that the needle 1404, 1404', and 1404" be navigated between ribs of the patient. Consequently, having a relatively smaller patient-contacting region 1400PCR, 1400PCR', and 1400PCR" (compared to the above-mentioned AVADs) and a more vertical configuration to accommodate the depth of needle penetration is indicated.

In addition, the character of the cavities within the patient that cause PTXs and the resulting nature of the penetrative procedures to relieve the PTXs generally only require that the APMADs 1400, 1400', and 1400" move the needle 1404, 1404', and 1404" in a direction along the longitudinal axis 1404LA, 1404LA', and 1404LA" of the needle. Consequently, the needle-manipulation system 1420, 1420', and 1420" of each of the APMADs 1400, 1400', and 1400" can be relatively simple and include an axial-actuation mechanism that effects the axial movement of the needle 1404, 1404', and 1404". Each axial-actuation mechanism may be of any suitable type, such as a rack-and-pinon type mechanism or a screw-type mechanism, among others.

Figure 14C:
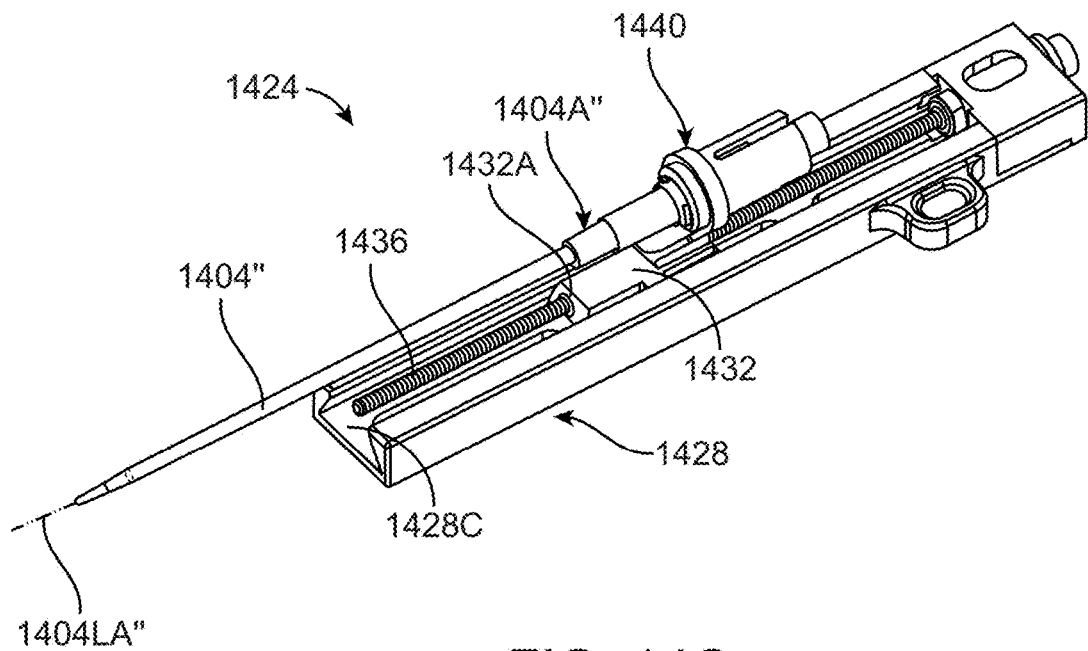
FIG. 14C is an enlarged perspective view of a portion of the needle-manipulation system of the righthand APMAD of FIG. 14A.

FIG. 14C illustrates a needle assembly 1424 of the needle-manipulation system 1420" of the APMAD 1400" of FIGS. 14A and 14B. In the example of FIG. 14C, the needle assembly 1424 includes a guide member 1428 having a dovetail channel 1428C that slidingly and conformally receives a carrier 1432. The carrier 1432 has a threaded aperture 1432A that threadingly receives a threaded rod 1436. When a motor (not shown) inside the body 1412" (FIG. 14A) of the APMAD 1400" rotates the longitudinally fixed threaded rod 1436 under control of the APMAD, the carrier 1432 moves along the threaded rod so as to move the needle 1404" in a direction along its longitudinal axis 1404LA" to effect the necessary operations of the PTX process. A needle holder 1440 firmly holds a needle assembly 1404A" during the operations. The needle assembly 1404A" may be, for example, a replaceable consumable component or a removable sterilizable component.

Figure 14D:
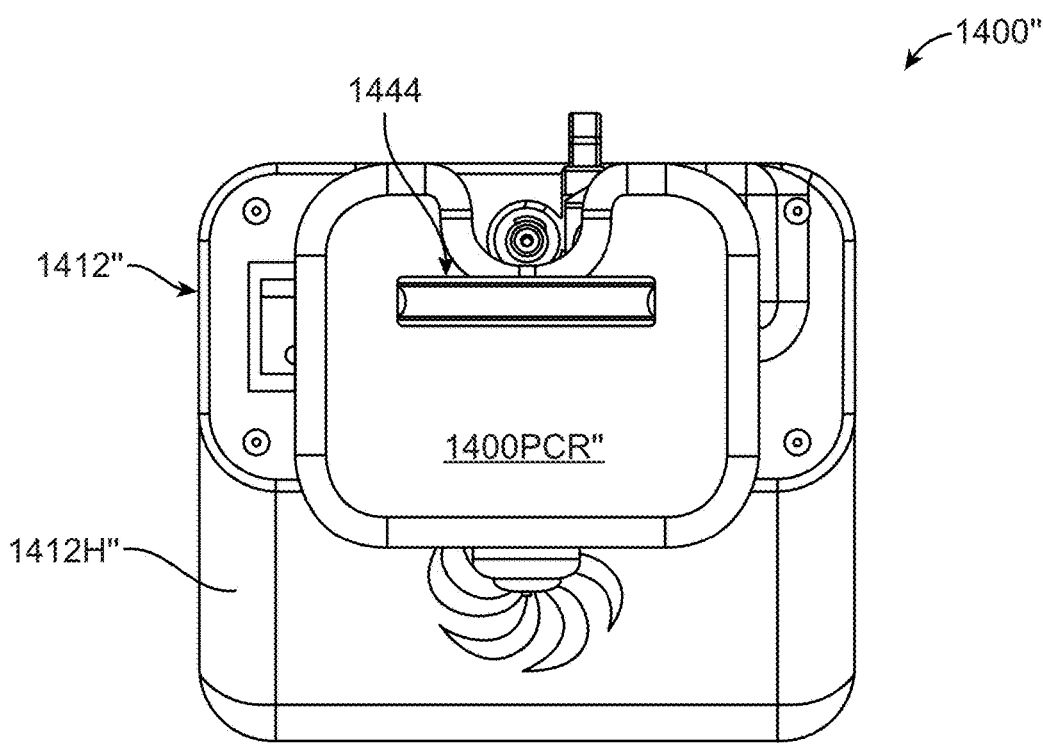
FIG. 14D is an enlarged isometric view from beneath the righthand APMAD of FIG. 14A, showing features on the patient-contacting region.

Referring to FIG. 14D, this figure shows a bottom view of the APMAD 1400″ in which the patient-contacting region 1400PCR″ is readily seen, as are upper portions of the body 1412″, including a bottom portion of a housing 1412H″ that houses the graphical display 1408 (FIG. 14A). As seen in FIG. 14D, the APMAD 1400″ includes a US transducer 1444 for acquiring US images during the PTX procedure. Each of the other two APMADs 1400 and 1400′ of FIGS. 14A and 14B may or may not have a US transducer that is the same as or similar to the US transducer 1444 of FIG. 14D and/or use a location for the corresponding US transducer that is similar to the location depicted in FIG. 14D. The US transducer 1444 may be any suitable scanning or non-scanning type transducer, such as any of the US transducers described above or otherwise known in the art.

In an example and referring to FIG. 14A, the APMAD 1400 does not include any onboard power source (e.g., battery), and power is provided via a wired tether (not shown) that connects to either of a pair of power-comm ports 1448(1) and 1448(2), each of which can be any suitable type of power-comm port, such as a power-comm port configured according to a commercial standard or to a proprietary standard, as desired. In some embodiments, one or both of the power-comm ports 1448(1) and 1448(2) may be replaced by a power port and a comm port. In some embodiments, the APMAD 1400 may include one or more onboard batteries (not shown) and/or one or more radios or other wireless communications device(s) (not shown) that also or alternatively allow the APMAD to communicate wirelessly with any desired offboard device(s).

In an example, the APMAD 1400′ also does not include any onboard power source (e.g., battery), and power is provided via a wired tether (not shown) that connects to any one or more of a variety of differing types of power ports, comm ports, and/or power-comm ports. In this example, the various ports are as follows: ports 1448(1)′ and 1448(2)′ are each a USB port; ports 1448(3)′ through 1448(6)′ are each a USB port; port 1448(7)′ is an Ethernet port; port 1448(8)′ is a USB-C power port, ports 1448(9)′ and 1448(10)′ are each a HDMI display port, port 1448(11)′ is a DC power port; and port 1448(12)′ is a coaxial-cable port. Those skilled in the art will readily appreciate that the ports 1448(1)′ through 1448(12)′ illustrated are merely exemplary and that other types and/or number of ports may be used. In some embodiments, the APMAD 1400′ may include one or more onboard batteries (not shown) and/or one or more radios or other wireless communications device(s) (not shown) that also or alternatively allow the APMAD to communicate wirelessly with any desired offboard device(s).

As noted above, the example APMAD 1400″ is completely self-contained. However, it, too, may include one or more power ports, comm ports, and/or power-comm ports, for example, for charging one or more onboard batteries (not shown), providing optional connectivity (e.g., to an external monitor, an external recording device, an external medical instrument, a laptop computer, etc.), or both, among other things. In this example, the APMAD 1400″ includes a coaxial-cable port 1448″. In some embodiments, the APMAD 1400″ may include one or more onboard batteries (not shown) and/or one or more radios or other wireless communications device(s) (not shown) that also or alternatively allow the APMAD to communicate wirelessly with any desired offboard device(s).

Example Methods of Using an APMAD/APMAD System

In an example, an APMAD/APMAD system of the present disclosure suitably configured for the penetrative procedure at hand may be used as follows. For simplicity, the term "APMAD" in this section refers to both a self-contained APMAD and an APMAD system that utilizes one or more external devices to round out a full feature set as discussed above. In addition, an APMAD of this section can be any of the APMADs/APMAD systems disclosed herein or otherwise covered by this disclosure. Those skilled in the art will readily understand that the examples of this section are merely illustrative and that many variations can be implemented depending, for example, on the particular configuration of the APMAD and/or the type of penetrative procedure being performed.

If the APMAD is in an initially powered-down state, when a user wants to perform a desired penetrative procedure, such as accessing a blood vessel or venting an air pocket to alleviate a PTX, among others, the user may power-on the APMAD. If a suitable needle/needle cartridge is not already installed in the APMAD, the user may perform the installation, either before or after powering-on the APMAD. If needed (e.g., if the APMAD is so equipped), the user may use any suitable soft control(s) and/or hard control(s) of the APMAD to initiate needle-tip calibration, which is preferably a contactless process. Depending on the configuration of the needle-tip-calibration system (e.g., location(s) of the calibration sensor(s)), the user may need to move the APMAD, for example, with the needle/needle cartridge installed, to a designated calibration location, such as a charging station, calibration cradle, carrying case, etc. In some cases, the APMAD may already be in the designated calibration location. If the needle-tip calibration is performed, the APMAD can automatically save any necessary calibration data for use in accurately guiding the needle tip during the performance of the relevant penetrative procedure. In some embodiments, the patient-contacting region of the APMAD may be provided by a consumable component or a sterilized component that is stored separately (e.g., in a sterile package). If so, the user may retrieve the separate component and install it onto the APMAD before engaging the APMAD with the patient.

After the APMAD performs the needle-tip calibration, if any, the user may place the APMAD into the appropriate operating mode (e.g., fully automated, partially automated, manual, etc.) and engage the patient-contacting region of the APMAD with the patient at a location at or proximate to the location where the APMAD will perform the penetrative procedure. The user may perform these steps in any suitable order (e.g., engage the patient first and then place the APMAD into the appropriate operating mode or engage the APMAD with the patient first and then place the APMAD into the appropriate operating mode). Example locations include, but are not limited to, on a patient's limb for a vascular-access procedure or on the patient's upper torso for PTX-decompression procedure. The user may place the APMAD into the appropriate operating mode in any suitable manner, such as using one or more soft user controls and/or hard user controls and/or any suitable menu(s) that the APMAD may display, among others. In an example, the appropriate operating mode may be an identification-and-tracking mode in which the APMAD automatically identifies and tracks one or more anatomical structures within the patient based on subcutaneous images that the APMAD acquires. As discussed above, the APMAD may be configured to display suitable identification and/or tracking information (e.g., vessel outlines, cavity outlines, cavity centers, target coordinates, target depths, target names, etc.) along with the images that the APMAD captures and uses for identification and tracking. As also discussed above, the APMAD may be configured to allow the user to provide one or more manual inputs, such as, for example, identifying to the APMAD a specific region of a full US image for the APMAD to focus on in determining a targeted anatomical structure and, optionally, corresponding targeted needle-tip location, or identifying to the APMAD a specific targeted needle-tip location to which the APMAD will automatically guide the needle tip during the penetrative procedure, among others.

In some embodiments, the user is the final decisionmaker on whether or not to initiate the penetrative procedure. For example, after the user has moved the APMAD around on the patient, for example, to gain an understanding of the patient's internal anatomical structures, the user may decide to proceed with the penetrative procedure. For example, the user may need to lock-in a targeted anatomical structure that the APMAD will then use for performing the penetrative procedure. In one example, the APMAD may be displaying, in real time, two possible targeted anatomical structures (e.g., a vein and an artery that are adjacent to one another, or a lung and a PTX-causing air cavity adjacent to the lung, among others), and the user may need to select which one is the targeted anatomical structure for the penetrative procedure. As another example, the user may need to select a desired needle-tip placement location within a targeted anatomical structure where the APMAD is to place the needle tip at the end of needle-tip insertion process. The user may navigate the images displayed on the graphical display for selection and/or target identification purposes and make any selection(s) and/or identifications using any one or more soft user controls and/or hard user controls, for example, using navigation methods and selection and identification methods known in the art. In some embodiments, the identification of each targeted anatomical structure and/or the determination of any desired needle-tip placement location may be completely automated and performed by the APMAD itself. If so, the user may cause the APMAD to make such automated selection(s) and/or identification(s) by actuating one or more appropriate soft and/or hard user controls.

In some embodiments, after the user has either made the appropriate selection(s) and/or identification(s) of the targeted anatomical structure(s) or the APMAD has made such selection(s) and/or identification(s), the user may cause the APMAD to initiate the penetrative procedure, for example, by actuating one or more soft and/or hard user controls of the APMAD. In response, the APMAD may begin automated needle-tip manipulation and guidance to direct the needle tip to the appropriate needle-tip placement location. As discussed above, the APMAD may use suitable algorithms for determining the appropriate control commands that the corresponding needle-manipulation system needs to manipulate the needle tip and the APMAD needs to guide the needle tip within the patient.

In some embodiments, the APMAD may be configured to allow the user to abort an in-process penetrative procedure, for example, via a user actuation of one or more soft user controls and/or hard user controls. In some embodiments, the aborting may result in the APMAD automatically retracting the needle tip from the patient. A benefit of the APMAD being handheld is that a failsafe aborting technique is that the user simply moves the APMAD out of engagement with the patient in an appropriate direction to withdraw the needle from the patient while minimizing tissue damage.

When the APMAD has properly inserted the needle into the patient so that the needle tip is at the proper or designated needle-tip placement location, the APMAD may stop the insertion and allow the user to perform any additional steps of the penetrative procedure. For example, a next step may be for the user to insert a catheter or other medical device into the patient via the needle. After such insertion, the user may remove the needle pursuant to the relevant protocol. As another example, the next step may be that the user disconnects the needle from the rest of the APMAD so as to leave the needle inserted in the patient. After removing the APMAD from the inserted needle, the user may then stabilize the needle using any suitable known technique, such as using adhesive tape, among others.

Depending on the penetrative procedure, if the needle is still attached to the APMAD and the needle tip needs to be withdrawn from the patient, the user may cause the APMAD to automatically withdraw the needle tip using the needle-manipulation system, for example, by actuating one or more soft user controls and/or hard user controls, among other things. If the user is done with using the APMAD on the current patient, the user may, for example, power-down the APMAD, remove any separate component containing the patient-contacting region, remove the needle, needle cartridge, or any remaining part of the needle cartridge, sterilize one or more component of the APMAD, install a new needle/needle cartridge, and return the APMAD to its storage location, such as, for example, a charging cradle, a carrying case, a docking station, etc., among other things, and any suitable combination thereof.

Example AVAD Demonstrations

The feasibility of embodiments of an AVAD of the present disclosure and its constituent elements have been demonstrated using analysis, simulations, benchtop demonstrations, vascular phantoms, anesthetized swine, and perfused human cadavers. The following sections describe demonstrations performed to date.

Vascular Phantom Demonstration

A controlled test was completed with more than 60 sequential attempts with the AVAD system using a vascular phantom. The goals of this test were to evaluate the ease of use of the AVAD with untrained operators and to collect data on the mechanical accuracy of the device for a range of challenging vessel diameters and depths. To complete the phantom testing, a mechanical technician with no prior knowledge of the AVAD's functionality or other biomedical US devices was trained in less than two hours to successfully manipulate and control the AVAD. The results of this testing demonstrated a success rate of 95% (60/63) for simulated vessels between 2 mm and 3 mm in diameter and vessel depths between 1.0 cm and 2.5 cm.

Anesthetized Swine Demonstration

Access attempts using the AVAD were carried out on two animals (45-50 kg) over four sessions. For these tests, and because the available computer system lacked the processing power for real-time DCNN use, the targeted blood vessels were identified by an attending physician. (The computer system has since been upgraded with a general processing unit (GPU)-based laptop computer to support real-time DCNN operation.) The four sessions involved exploratory testing to obtain feedback on the device and its operation in a clinical setting. Another goal of the exploratory tests was to identify the most promising device settings, such as needle speed, trajectories, and oscillation frequency and amplitude. Device and software refinements were implemented between each round of exploratory tests.

Perfused Human Cadaver Demonstration

Following the anesthetized swine testing, and under the supervision of our medical collaborator, AVAD testing was completed with a perfused human cadaver. Perfused cadaver testing has been used for many years as a circulatory model and is thought to be one of the best models for testing venous access short of human experimentation. For these tests, the vasculature of the cadaver was perfused with embalming fluid to inflate the collapsed vessels so that they could be visualized under US. Tests were performed with the AVAD on peripheral and central veins and arteries in both leg regions. (The vessels in the upper extremities remained collapsed despite the circulation protocol and were not used for testing.) The data from the cadaver test is summarized in Table 1, below. The data are promising, and when broken down by vessel diameter and depth, are consistent with the data reported by others for manual US-guided vascular access by trained medical personnel.

TABLE 1

AVAD Test Data with Perfused Human Cadavers.

| Vessel Type | Vessel Size (mm) | Vessel Depth (cm) | Success Rate |
| --- | --- | --- | --- |
| Peripheral | 2.8 to 4.0 | 0.7 to 1.7 | 75% (6/8) |
| Central | 5.0 to 7.0 | 2.0 to 2.7 | 87% (13/15) |
|  |  | TOTAL | 83% (19/23) |

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for assisting a user with penetratingly accessing a targeted anatomical structure within a patient during an access procedure, the apparatus comprising:
   a body that includes:
      a grasping region designed, configured, and provided to allow the user to grasp the apparatus with a first hand of the user so as to handhold and manipulate the apparatus during the access procedure;
      at least one user control deployed to allow the user to control at least one function of the apparatus, the at least one control being located on the body so as to be accessible to actuation by the first hand of the user while the first hand is handholding the apparatus by the grasping region during the access procedure; and
      a patient-contacting region designed, configured, and located so as to contact the patient during the access procedure, wherein the patient-contacting region includes a needle port;
   an imaging transducer coupled to the body so as to move with the body when the user manipulates the apparatus, the imaging transducer deployed to generate images of tissue inside the patient during the access procedure; and
   a needle-manipulation system integrated with the body so as to move with the body when the user manipulates the apparatus, the needle-manipulation system including:
      a needle holder that holds a needle, having a needle tip, during the access procedure and is designed and configured to move the needle in response to needle-guidance commands so as to penetrate the patient and access the targeted anatomical structure, and
      a drive mechanism coupled to the needle holder for driving movement of the needle within the needle port during the access procedure, wherein the drive mechanism includes drive components within the grasping region of the body.

2. The apparatus of claim 1, wherein the drive components comprise a plurality of motors contained within the body.

3. The apparatus of claim 1, further comprising a graphical display that displays the images that the imaging transducer generates.

4. The apparatus of claim 1, wherein the needle-manipulation system includes a needle-jab system that, during use, imparts a jabbing motion to the needle tip.

5. The apparatus of claim 1, wherein the needle-manipulation system includes a needle-oscillation system that, during use, imparts a vibratory motion to the needle tip.

6. The apparatus of claim 1, further comprising a touchscreen display, wherein the at least one user control is a soft control on the touchscreen display.

7. The apparatus of claim 1, wherein the at least one user control initiates an automated process performed by the apparatus during the access procedure.

8. The apparatus of claim 1, wherein the at least one user control is configured to cause the apparatus to perform a needle-insertion process that inserts the needle tip into the targeted anatomical structure.

9. The apparatus of claim 1, wherein at least one of the at least one user control is configured to receive one or more user inputs that cause the apparatus to generate the needle-guidance commands.

10. The apparatus of claim 1, wherein the body has a bottom surface, and the patient-contacting region coextensive with the bottom surface of the body.

11. The apparatus of claim 10, wherein the needle port is fully surrounded by the patient-contacting region.

12. The apparatus of claim 10, wherein the needle port is located along one edge of the patient-contacting region.

13. The apparatus of claim 12, wherein the patient-contacting region is generally rectangular in shape but for the needle port.

14. The apparatus of claim 10, wherein the needle port is defined by first and second extensions of the patient-contacting region.

15. The apparatus of claim 14, wherein the imaging transducer is mounted in one of the first and second extensions.

16. The apparatus of claim 1, wherein the patient-contacting region is provided on a removable member that is removably secured to the body.

17. The apparatus of claim 16, wherein the removable member is a consumable.

18. The apparatus of claim 1, wherein the body comprises a housing that includes contours shaped to conformally receive one or more portions of the first hand.

19. The apparatus of claim 18, wherein the grasping region is configured so that the first hand grasps the apparatus with a side grasp.

20. The apparatus of claim 19, wherein the body has an upper portion, and the apparatus further comprises a graphical display on the upper portion of the body.

21. The apparatus of claim 1, wherein the body comprises a housing, and the apparatus further includes operating and control electronics contained within the housing.

22. The apparatus of claim 21, wherein the operating and control electronics include one or more processors and one or more memories containing machine-executable instructions for automatically identifying and tracking the targeted anatomical structure using the images from the imaging transducer.

23. The apparatus of claim 22, further comprising a graphical display coupled to the body, wherein the one or more memories further contain machine-executable instructions for displaying the images from the imaging transducer enhanced with information generated by the machine-executable instructions for automatically identifying and tracking the targeted anatomical structure.

24. The apparatus of claim 1, wherein the body includes a user-engagement region designed, configured, and provided to allow the user to engage, simultaneously with the user grasping the grasping region with the first hand, the apparatus with a second hand so as to assist the user with manipulating the apparatus.

25. The apparatus of claim 24, wherein the grasping region is located away from the patient-contacting region of the body and the user-engagement region is located proximate to the patient-contacting region.

26. The apparatus of claim 25, wherein the user-engagement surface is provided on a first extension of the patient-contacting region.

27. The apparatus of claim 26, wherein the patient-contacting region comprises a second extension, and the imaging transducer is integrated with the second extension.

28. The apparatus of claim 27, wherein the first and second extensions are spaced from one another and define a needle port therebetween.

29. The apparatus of claim 1, wherein the needle-manipulation system comprises the needle-holder pivotably mounted to the body.

30. The apparatus of claim 29, wherein the needle-holder comprises a disk.

31. The apparatus of claim 29, wherein the needle-holder is pivotable in a pivot plane, and the needle-manipulation system includes a mechanism for moving the needle-holder in a direction normal to the pivot plane.

32. The apparatus of claim 1, wherein the imaging transducer comprises an ultrasound transducer.

33. The apparatus of claim 32, wherein the ultrasound transducer is part of an ultrasound imaging system that is operatable in both a brightness mode and at least one Doppler mode.

34. The apparatus of claim 33, further comprising memory storing machine-executable instructions for automatically switching the ultrasound imaging system between the brightness mode and the at least one Doppler mode to effect identification and tracking of the targeted anatomical structure.

35. The apparatus of claim 1, wherein the apparatus includes a needle-tip-calibration system for calibrating, in a contactless manner, an actual location of the needle tip relative to a desired coordinate system.

36. The apparatus of claim 35, wherein the needle-tip-calibration system includes at least one sensor that generates information regarding location of the needle tip.

37. The apparatus of claim 35, wherein the needle-tip-calibration system includes a stereo imaging system that generates stereo images that include the needle tip.

38. The apparatus of claim 1, wherein the at least one user control comprises a first tactile control on the body.

39. The apparatus of claim 38, wherein the first tactile control comprises a pushbutton.

40. The apparatus of claim 38, wherein the first tactile control comprises a joystick.

41. The apparatus of claim 38, further comprising a second tactile control on the body.

42. The apparatus of claim 41, wherein the first tactile control comprises a pushbutton, and the second tactile control comprises a joystick.

43. The apparatus of claim 1, wherein the apparatus is tethered to one or more offboard devices that include a graphical display that, during use of the apparatus, displays the images acquired by the imaging transducer.

44. The apparatus of claim 43, wherein the apparatus is wiredly tethered to the one or more offboard devices.

45. The apparatus of claim 43, wherein the apparatus is wirelessly tethered to the one or more offboard devices.

46. The apparatus of claim 43, wherein the one or more offboard devices includes an electronics control unit.

47. The apparatus of claim 1, further comprising a memory that contains needle-guidance algorithms that automatedly generate the needle-guidance commands.

48. The apparatus of claim 47, wherein at least one of the at least one user control is configured to receive one or more user inputs that trigger the automated needle-guidance algorithms to generate the needle-guidance commands.

49. The apparatus of claim 1, wherein:
the grasping region is a longitudinal grip extending along a longitudinal axis and that is designed and configured for the user to grasp at a portion of the body using a side grip with the first hand;
the needle manipulation system is designed and configured to move the needle holder in a direction parallel to the longitudinal axis of the grasping region; and
the needle port is a notch-type needle port located along an edge of the patient-contacting region.

50. The apparatus of claim 49, wherein the longitudinal grip has a transverse cross-sectional area and the patient-contacting region has a patient-contacting area that is greater than the transverse cross-sectional area of the longitudinal grip.

51. The apparatus of claim 49, wherein the longitudinal grip has a longitudinal recess extending parallel to the longitudinal axis of the grasping region, and the needle holder is located within the recess.

52. A system, comprising:
the apparatus of claim 1;
a computing system comprising storge memory that contains machine-executable instructions for identifying and tracking the targeted anatomical structure, wherein the machine-executable instructions comprise:
image-processing algorithms configured to identify and track the targeted anatomical structure using the images generated via the imaging transducer; and
needle-guidance algorithms configured to generate needle-guidance commands that control the needle-manipulation system so as to insert the needle tip into the targeted anatomical structure as a function of information generated by the image-processing algorithms and the needle-manipulation system.

53. The system of claim 52, wherein the computing system is located onboard the apparatus.

54. The system of claim 52, wherein the computing system is located offboard the apparatus.

55. The system of claim 52, further comprising a graphical display in operative communication with the computing system so as to display information about the access procedure to the user.

56. The system of claim 55, wherein the graphical display is located in a device separate from the apparatus, and the system further comprises a wired tether operatively connecting the device and the apparatus with one another.

* * * * *